(12) United States Patent
Kiss

(10) Patent No.: US 9,538,491 B2
(45) Date of Patent: *Jan. 3, 2017

(54) CELLULAR NETWORK ASSISTED PROXIMITY SERVICES REGISTRATION PROCEDURES AND EVENT FRAMEWORK FOR PROXIMITY REQUESTS/ALERTS USING SESSION INITIATION PROTOCOL

(71) Applicant: Apple Inc., Cupertino, CA (US)

(72) Inventor: Krisztian Kiss, Hayward, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/166,325

(22) Filed: May 27, 2016

(65) Prior Publication Data

US 2016/0278037 A1    Sep. 22, 2016

Related U.S. Application Data

(63) Continuation of application No. 14/628,117, filed on Feb. 20, 2015, now Pat. No. 9,380,549.

(60) Provisional application No. 61/971,045, filed on Mar. 27, 2014, provisional application No. 61/971,047, filed on Mar. 27, 2014.

(51) Int. Cl.
| | |
|---|---|
| *H04W 4/00* | (2009.01) |
| *H04W 60/00* | (2009.01) |
| *H04W 8/00* | (2009.01) |
| *H04L 29/06* | (2006.01) |
| *H04W 4/02* | (2009.01) |
| *H04W 88/02* | (2009.01) |

(52) U.S. Cl.
CPC .......... *H04W 60/00* (2013.01); *H04L 65/1006* (2013.01); *H04L 65/1073* (2013.01); *H04W 4/023* (2013.01); *H04W 8/005* (2013.01); *H04W 88/02* (2013.01)

(58) Field of Classification Search
None
See application file for complete search history.

(56) References Cited

U.S. PATENT DOCUMENTS

| | | |
|---|---|---|
| 2004/0203763 A1 | 10/2004 | Tammi |
| 2007/0097886 A1 | 5/2007 | Schwagmann et al. |
| 2011/0286389 A1 | 11/2011 | Atarius et al. |
| 2013/0303088 A1 | 11/2013 | Watfa et al. |

(Continued)

OTHER PUBLICATIONS

Japanese Office Action, Application No. 2015-038107, mailed Feb. 19, 2016, 9 pages.

(Continued)

*Primary Examiner* — Adolf Dsouza
(74) *Attorney, Agent, or Firm* — Meyertons Hood Kivlin Kowert & Goetzel, P.C.; Jeffrey C. Hood; Joel L. Stevens

(57) ABSTRACT

A system, apparatus, and method for providing proximity services (ProSe) registration, proximity request, proximity alert, proximity request cancellation, and deregistration handling between a wireless device and a ProSe function of a cellular core network using session initiation protocol. A wireless device and a ProSe function of a cellular core network may exchange SIP signaling messages to register and de-register the wireless device for cellular network assisted proximity services. The wireless device and the ProSe function may further (while the wireless device is registered) exchange SIP signaling messages to request proximity alerts, provide proximity alerts, and request cancellation of proximity alert requests.

20 Claims, 16 Drawing Sheets

(56) References Cited

U.S. PATENT DOCUMENTS

2014/0286193 A1  9/2014  Ghaboosi et al.
2014/0301270 A1  10/2014  Johnsson et al.
2014/0348061 A1  11/2014  Salkintzis

OTHER PUBLICATIONS

Broadcom Corporation, NEC, LG Electronics, Intel, "Clarifications on IMS Option for Authentication and IMS Presence option for Proximity Detection", 3GPP SA WG2 Meeting S2#101 S2-140155, 3GPP, Jan. 20-24, 2014, Taipei, Taiwan, 13 pages.
Broadcom Corporation, "Further Architecture Consideration on EPC based ProSe Discovery Procedures using Presence Services", 3GPP SA WG2 Meeting #96 S2-131094, 3GPP, Apr. 8-12, 2013, San Diego, CA, 7 pages.
J. Rosenberg, "A Session Initiation Protocol (SIP) Event Package for Registrations Status of this Memo", RFC 3680, Mar. 2004, 27 pages.
NEC, "ProSe Service Coninuity", 3GPP SA WG2 Meeting S2#98 S2-132556, 3GPP, Jul. 15-19, 2013, Valencia, Spain, 12 pages.
Itri, "Updates to Annex I Section 5.x.5", 3GPP SA WG2 Meeting #101, S2-140283, 3GPP, Jan. 20-24, 2014, 4 pages.
3rd Generation Partnership Project, "Technical Specification Group Services and System Aspects; Study on architecture enhancements to support Proximity-based Services (ProSe)", Feb. 2014, 15 pages.

CELLULAR NETWORK ASSISTED PROXIMITY SERVICES REGISTRATION PROCEDURES AND EVENT FRAMEWORK FOR PROXIMITY REQUESTS/ALERTS USING SESSION INITIATION PROTOCOL

PRIORITY CLAIM

The present application is a continuation of U.S. patent application Ser. No. 14/628,117, titled "Cellular Network Assisted Proximity Services Registration Procedures and Event Framework for Proximity Requests/Alerts using Session Initiation Protocol claims", filed on Feb. 20, 2015, whose inventor is Krisztian Kiss, and which claims benefit of priority to U.S. Provisional Application No. 61/971,045 titled "Cellular Network Assisted Proximity Services Registration Procedures Using Session Initiation Protocol" and filed on Mar. 27, 2014, and to U.S. Provisional Application No. 61/971,047 titled "Session Initiation Protocol Event Framework for Cellular Network Assisted Proximity Requests/Alerts" and filed on Mar. 27, 2014, all of which are hereby incorporated by reference in their entirety as though fully and completely set forth herein.

FIELD

The present application relates to wireless devices, and more particularly to apparatus, systems, and methods for registering for proximity services with a cellular core network using session initiation protocol signaling and for providing proximity request and alert capabilities in a cellular core network using a session initiation protocol event framework.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Multiple different modes of wireless communication are possible. "Infrastructure mode" wireless communication, in which wireless endpoint devices communicate by way of one or more intermediate devices (e.g., base stations or access points), and "peer-to-peer" or "device-to-device" wireless communication, in which wireless endpoint devices communicate directly, are two such exemplary modes of wireless communication.

SUMMARY

Embodiments are presented herein of apparatus, systems, and methods for registering and de-registering for proximity services with a cellular core network and for providing proximity request, proximity alert, and proximity request cancellation signaling capabilities using session initiation protocol (SIP) messages, and of devices configured to implement the methods.

According to the techniques described herein, various SIP event packages, including existing and/or new packages, may be used to provide a signaling framework for a cellular network provide proximity services assistance to user devices coupled to that cellular network.

For example, for registration for cellular network assisted proximity services, it may be possible for a wireless device to use a SIP REGISTER request to register with a proximity services function of a cellular network for proximity services. The wireless device may further subscribe to a registration event package in order to provide a framework for the network to keep up-to-date the status of the wireless device's registration. As a special case, the wireless device may also de-register by sending a SIP REGISTER request with an expiration field having a value of "0"; network-initiated de-registration may also be possible, for example by sending an SIP NOTIFY request for the registration event package with state attributes set to "terminated" and/or even attributes set to "unregistered" or "deactivated" or "rejected".

As another example, a SIP "epcprose" event package may be defined and used for proximity requests between a wireless device and a ProSe function. In this case, the wireless device may subscribe for the epcprose event package, with parameters set to specify another wireless device for which the wireless device is requesting proximity alerts, along with various parameters of the proximity request. One or more other event packages, such as a presence event package (e.g., for use between different ProSe functions) and a presence.winfo event package (e.g., for use in monitoring the state of a wireless device's own presence subscriptions), may also be used in conjunction with the proximity request and alert framework.

The techniques described herein may be implemented in and/or used with a number of different types of devices, including but not limited to proximity services function (ProSe Function) entities and/or other cellular core network entities, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
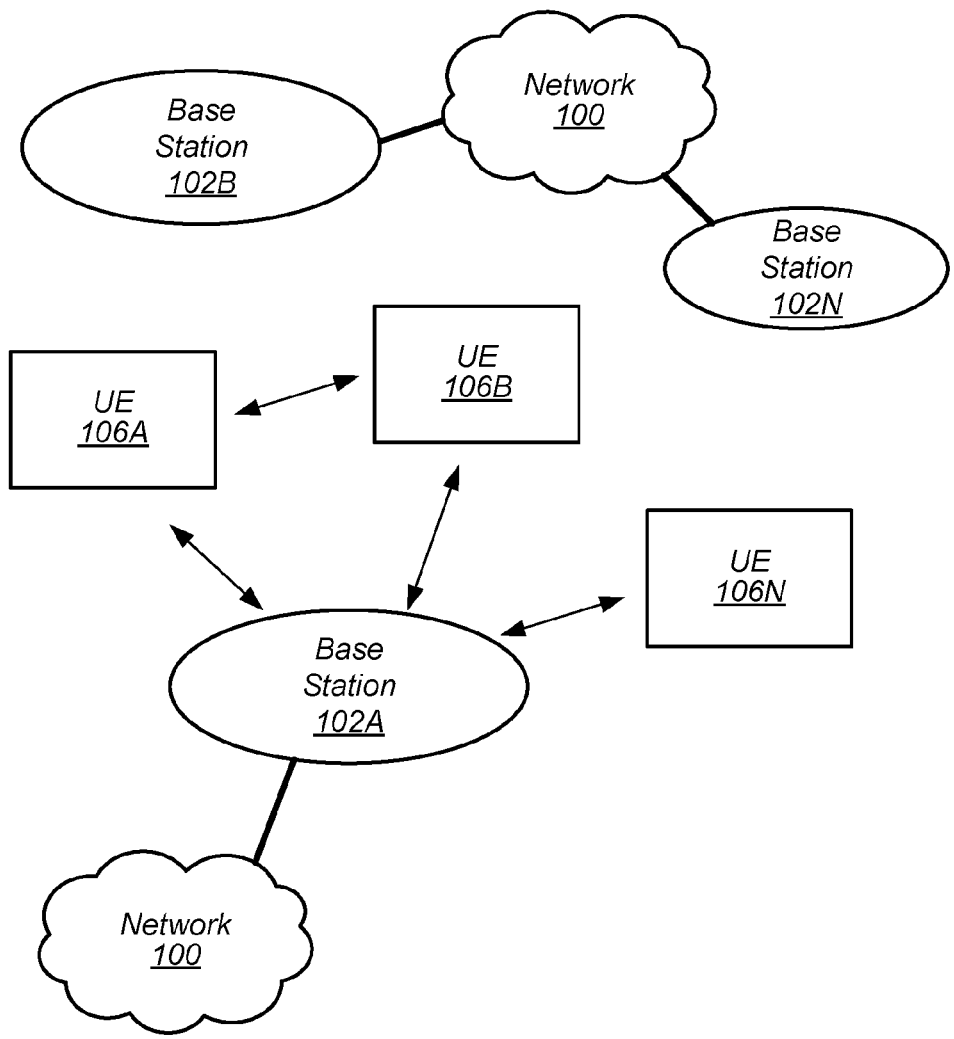
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
GSM: Global System for Mobile Communications
GERAN: GSM EDGE Radio Access Network
UMTS: Universal Mobile Telecommunications System
UTRAN: UMTS Terrestrial Radio Access Network or Universal Terrestrial Radio Access Network
LTE: Long Term Evolution
E-UTRAN: Evolved UMTS Radio Access Network or Evolved Universal Radio Access Network
EPC: Evolved Packet Core
EPS: Evolved Packet Service
ProSe: Proximity Services
MME: Mobility Management Entity
HSS: Home Subscriber Server
SGW: Serving Gateway
SUPL: Secure User Plane Location
SLP: SUPL Location Platform
AS: Access Stratum
NAS: Non-Access Stratum
PLMN: Public Land Mobile Network
IMSI: International Mobile Subscriber Identity
SIP: Session Initiation Protocol
OMA: Open Mobile Alliance
FQDN: Fully Qualified Domain Name Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
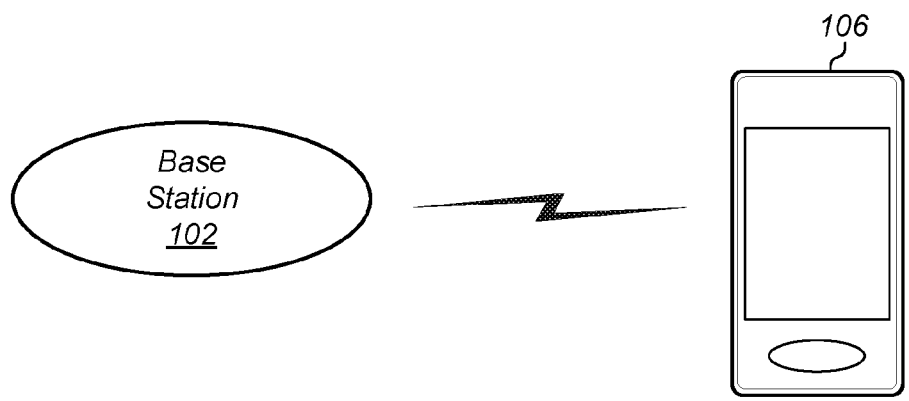
FIG. 2 illustrates a base station (BS) in communication with a user equipment (UE) device, according to some embodiments.
Figure 3:
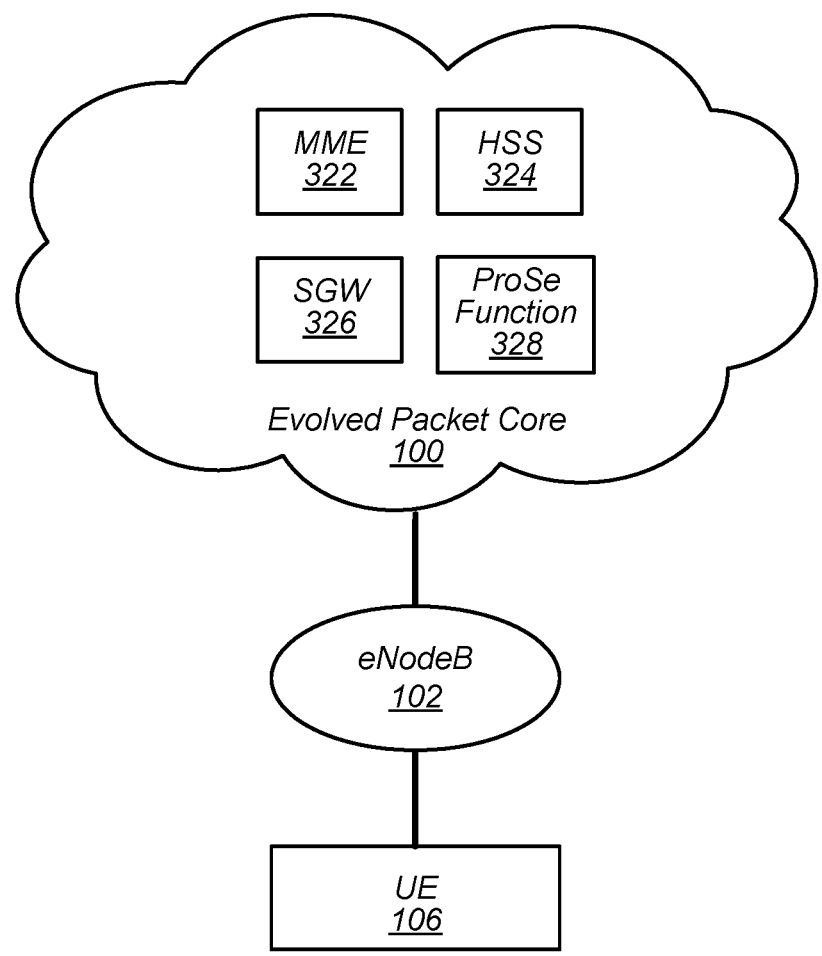
FIG. 3 illustrates an exemplary (and simplified) cellular network architecture, according to some embodiments.

FIGS. 1-3—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In addition to "infrastructure mode" communication in which UEs 106 communicate with each other and other networks/devices indirectly by way of base stations 102, some UEs may also be capable of communicating in a "peer-to-peer" (P2P) or "device-to-device" (D2D) mode of communication. In such a mode (possibly requiring a certain degree of proximity), UEs 106 such as UE 106A and UE 106B may communicate directly with each other (e.g., instead of by way of an intermediate device such as base station 102A). For example, LTE D2D, Bluetooth ("BT", including BT low energy ("BLE"), Alternate MAC/PHY ("AMP"), and/or other BT versions or features), WLAN Direct/Wi-Fi ad-hoc/peer-to-peer, and/or any other peer-to-peer wireless communication protocol may be used to facilitate direct communications between two UEs 106.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

As noted above, the UE 106 may be configured to communicate using any of multiple RATs. For example, the UE 106 may be configured to communicate using two or more of GSM, CDMA2000, LTE, LTE-A, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

FIG. 3 illustrates an exemplary, simplified portion of a wireless communication system, such as a 3GPP compliant cellular network, according to some embodiments.

As shown, a UE 106 may be in communication with a base station, shown in this exemplary embodiment as an eNodeB 102. In turn, the eNodeB may be coupled to a core network, shown in this exemplary embodiment as an evolved packet core (EPC) 100. As shown, the EPC 100 may include mobility management entity (MME) 322, home subscriber server (HSS) 324, serving gateway (SGW) 326, and Proximity Services (ProSe) Function 328. The EPC 100 may include various other devices and/or entities known to those skilled in the art as well.

Figure 4:
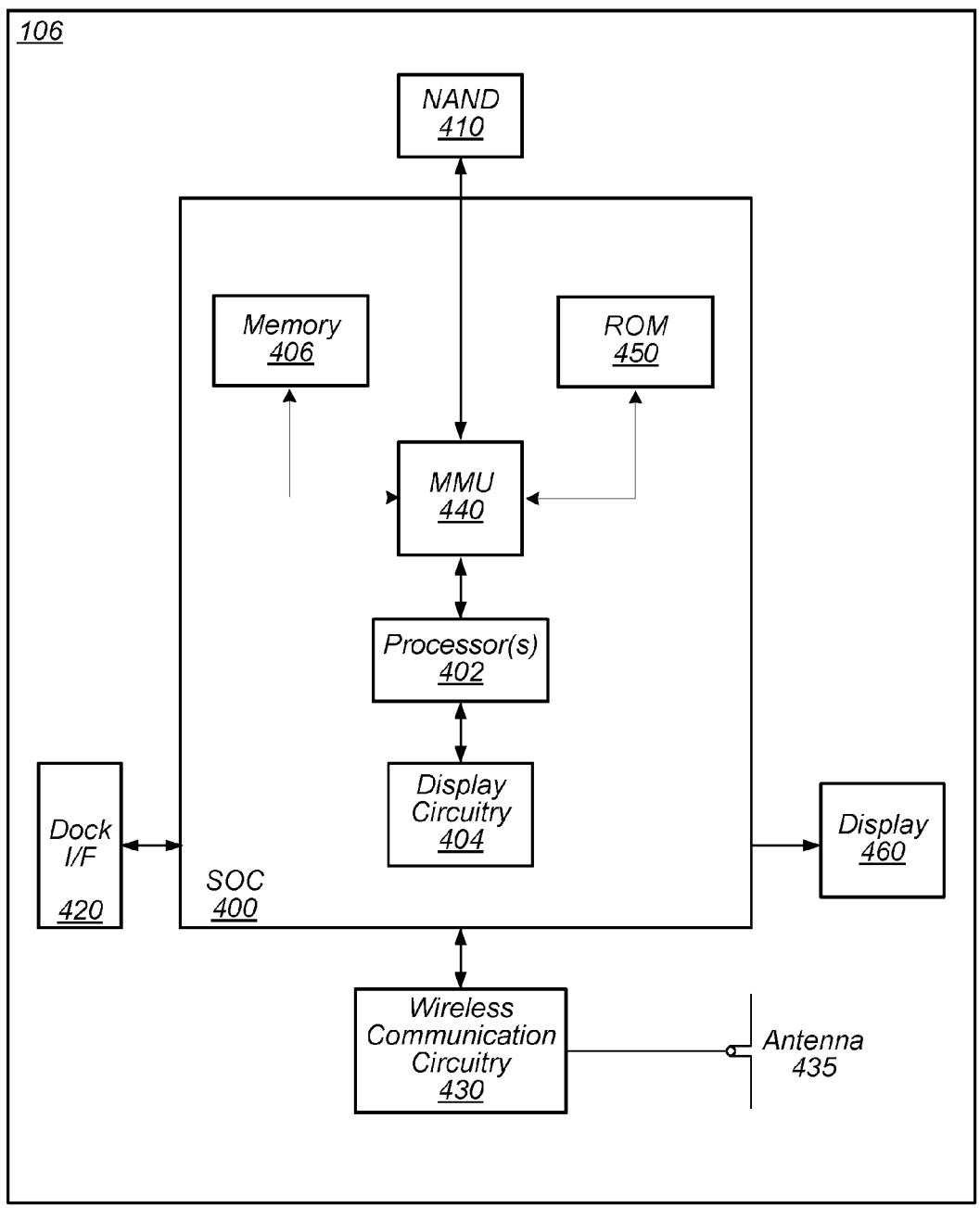
FIG. 4 illustrates an exemplary block diagram of a UE, according to some embodiments.

FIG. 4—Exemplary Block Diagram of a UE

FIG. 4 illustrates an exemplary block diagram of a UE 106, according to some embodiments. As shown, the UE 106 may include a system on chip (SOC) 400, which may include portions for various purposes. For example, as shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430, connector I/F 420, and/or display 460. The MMU 440 may be configured to perform memory protection and page table translation or set up. In some embodiments, the MMU 440 may be included as a portion of the processor(s) 402.

As also shown, the SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, and wireless communication circuitry 430 (e.g., for LTE, CDMA2000, Bluetooth, WiFi, etc.).

As noted above, the UE 106 may be configured to communicate wirelessly using multiple wireless communication technologies. As further noted above, in such instances, the wireless communication circuitry 430 may include radio components which are shared between multiple wireless communication technologies and/or radio components which are configured exclusively for use according to a single wireless communication technology. As shown, the UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna(s) 435 to perform the wireless communication.

As described further subsequently herein, the UE 106 may include hardware and software components for implementing part or all of the methods described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5:
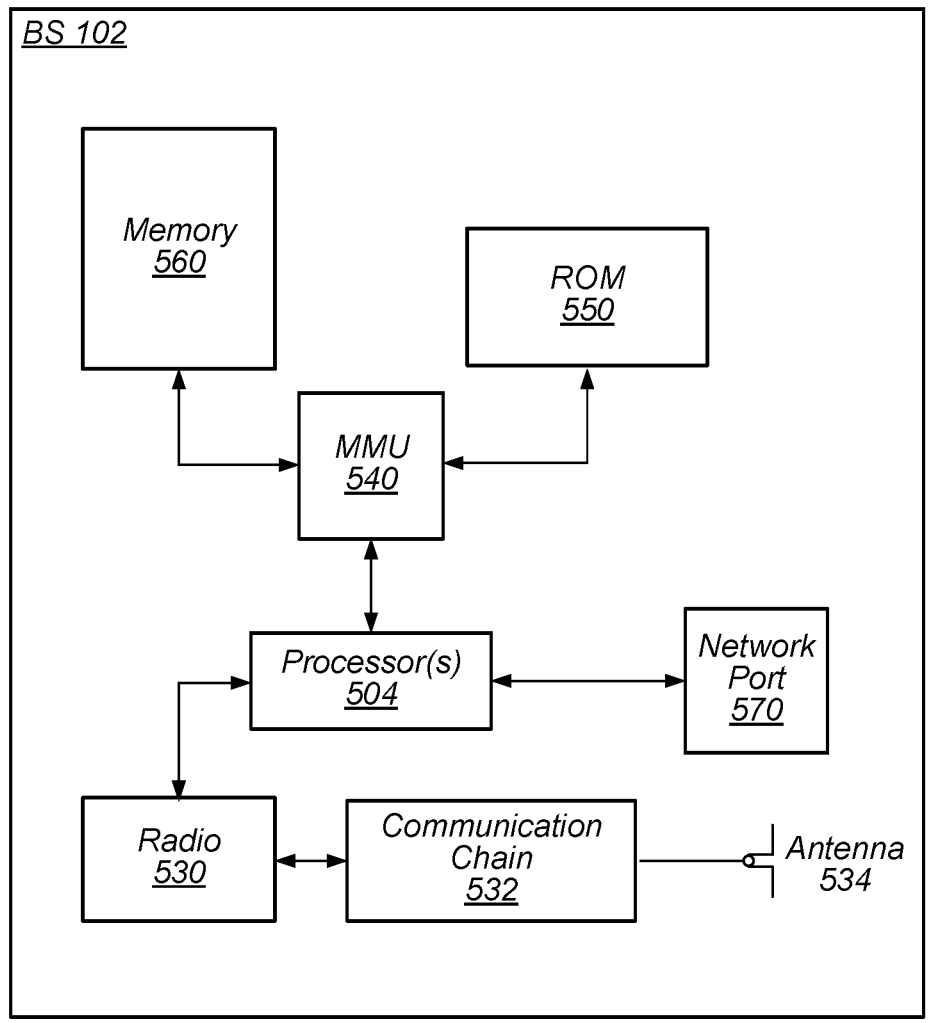
FIG. 5 illustrates an exemplary block diagram of a BS, according to some embodiments.

FIG. 5—Base Station

FIG. 5 illustrates an exemplary block diagram of a base station 102, according to some embodiments. It is noted that the base station of FIG. 5 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices serviced by the cellular service provider).

The base station 102 may include at least one antenna 534. The antenna(s) 534 may be configured to operate as a wireless transceiver and may be further configured to communicate with UE devices 106 via wireless communication circuitry 530. The antenna(s) 534 communicates with the wireless communication circuitry 530 via communication chain 532. Communication chain 532 may be a receive chain, a transmit chain or both. The wireless communication circuitry 530 may be configured to communicate via various wireless communication technologies, including, but not limited to, LTE, LTE-A, GSM, WCDMA, CDMA2000, Wi-Fi, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 6:
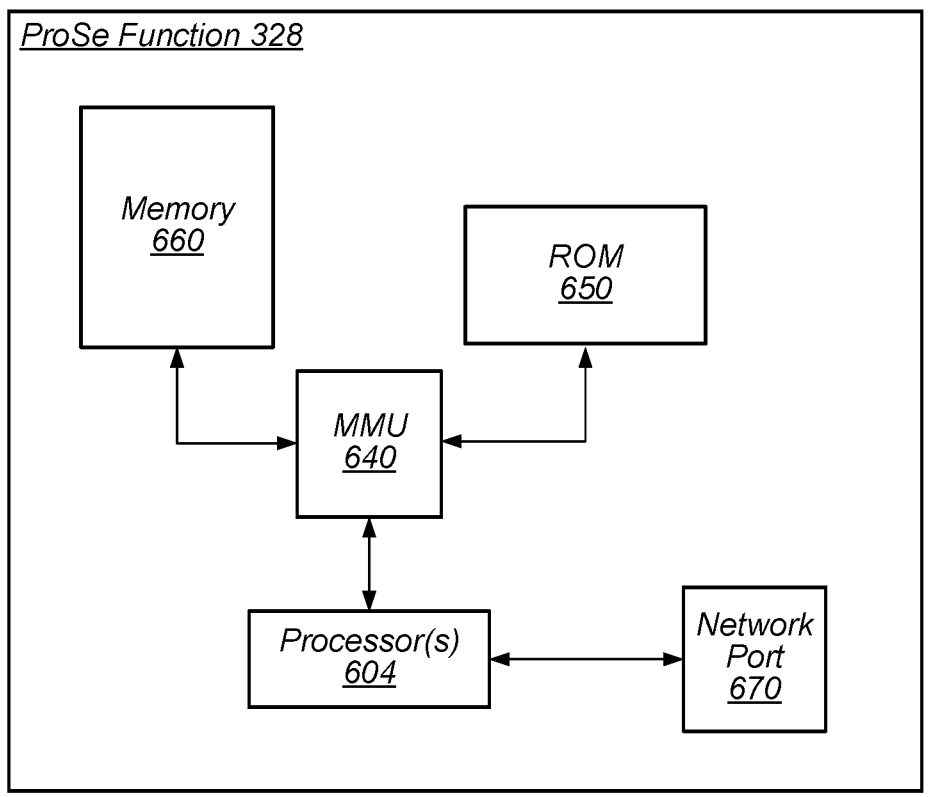
FIG. 6 illustrates an exemplary block diagram of a ProSe Function, according to some embodiments.

FIG. 6—Proximity Services Function

FIG. 6 illustrates an exemplary block diagram of a ProSe Function entity 328, according to some embodiments. It is noted that the ProSe Function 328 of FIG. 6 is merely one example of a possible ProSe Function 328. As shown, the ProSe Function 328 may include processor(s) 604 which may execute program instructions for the ProSe Function 328. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The ProSe Function 328 may include at least one network port 670. The network port 670 may be configured to couple to one or more base stations and/or other cellular core network entities and/or devices.

The ProSe Function 328 may provide proximity related services to a plurality of devices, such as UE devices 106. For example, the ProSe Function 328 may be responsible for registering UE devices for proximity services, receiving and configuring proximity requests, and providing proximity notices to UE devices 106.

The ProSe Function 328 may communicate with base stations (e.g., eNBs) and/or other core network entities/devices by means of any of various communication protocols and/or interfaces. As one example, in a 3GPP context, the ProSe Function 328 may use any of a PC2, PC3, PC4, PC6, PC7 and/or any of various other communication protocols or interfaces to communicate with other cellular network components.

The processor(s) 604 of the ProSe Function 328 may be configured to implement part or all of the methods described herein, e.g., by executing program instructions stored on a memory medium (e.g., a non-transitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Figure 7:
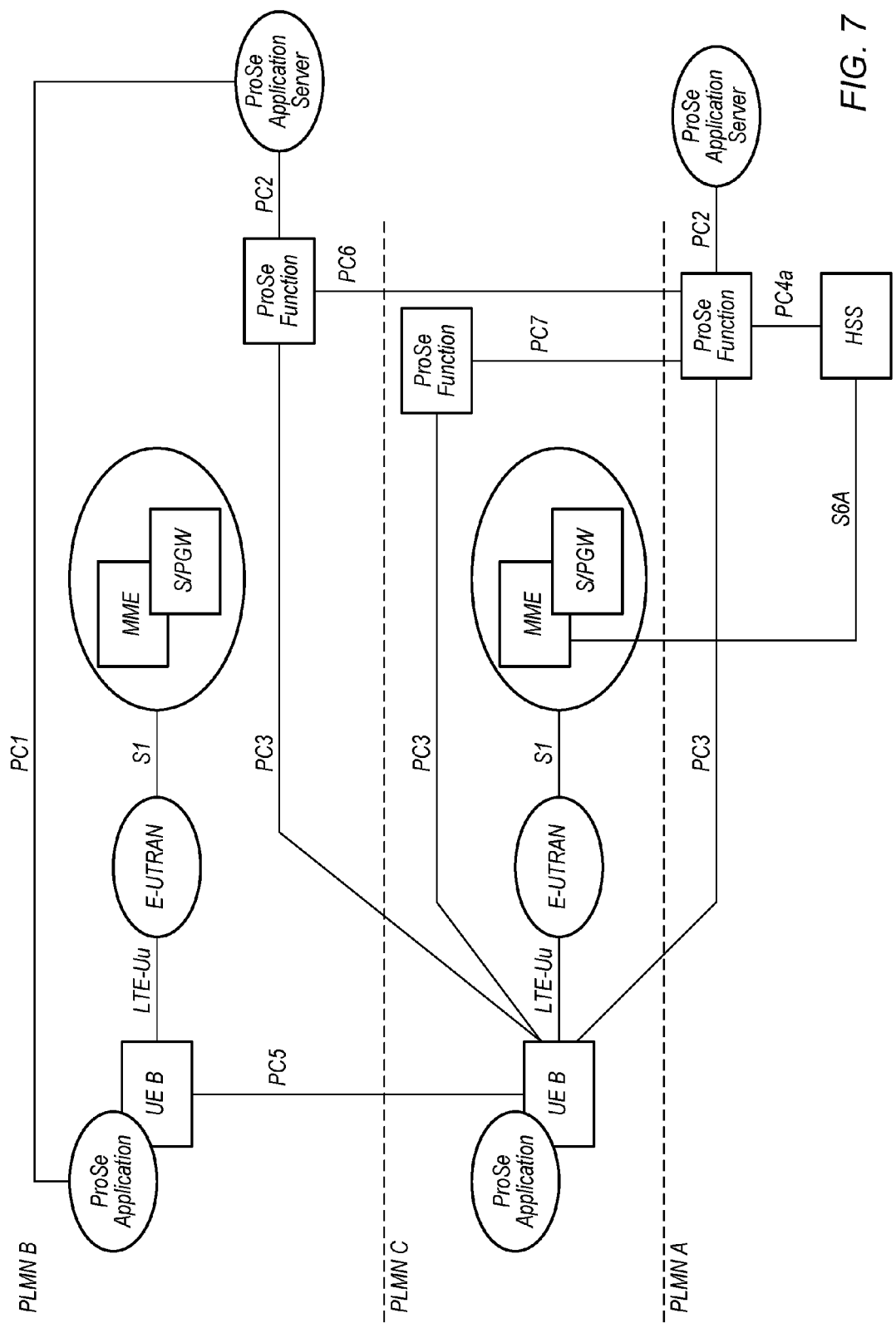
FIG. 7 illustrates an exemplary architecture for providing network-assisted proximity services, according to some embodiments.

FIG. 7—Proximity Services Architecture

As described herein, proximity services may include monitoring proximity of certain devices for which proximity detection is requested, and providing notifications to those devices when an appropriate level of proximity is detected. In some instances, support or assistance information for facilitating direct discovery and communication between proximate devices may also be provided in conjunction with proximity services. Registration and authorization/authentication for such services, as well as the services themselves, may be provided to subscriber devices by one or more proximity services (ProSe) functions in one or more cellular core networks, generally in conjunction with one or more other network entities. FIG. 7 illustrates an exemplary (roaming) network architecture in which network-based proximity services may be provided, according to some embodiments. It should be noted that while the illustrated architecture represents one possible architecture which may be used to provide proximity services, numerous variations and alternatives are also possible, and the specific features of the architecture of FIG. 7 should not be considered limiting to the disclosure as a whole.

As shown, each of multiple wireless user equipment (UE) devices may include a ProSe enabled application. The UEs may be attached to different public land mobile networks (PLMNs), e.g., depending on the location and/or service provider of each UE. For example, a first UE ('UE A') is shown as being attached to a PLMN ('PLMN C') which is not its home PLMN ('PLMN A'), i.e., in a roaming scenario. A second UE ('UE B'), meanwhile, is shown as being attached to a further PLMN (PLMN B), which may be its home PLMN. In addition to core network functionality such as a mobility management entity (MME) and serving and/or packet gateway (S/PGW) which may be provided by way of an enhanced universal terrestrial radio access network (E-UTRAN), each PLMN may include a respective ProSe function. A home subscriber server (HSS) may also be provided as part of each PLMN, at least in some instances. Additionally, one or more ProSe application servers (e.g., corresponding to various possible ProSe capable applications, and which may at least in some instances be third party servers external to each cellular core network) may be provided.

As shown, a variety of communication mechanisms/reference points (e.g., PC1-PC7, S1, LTE-Uu, S6a, etc.) may be used for communicating between the various illustrated entities. For example, PC1 may include application level signaling, PC2 may provide identity translation for ProSe discovery, and PC5 may include a device-to-device interface for direct communication between UEs. At least in some instances, PC3 and PC6 may use the evolved packet core (EPC) user plane for transport, and may be "over IP" reference points.

FIGS. 8-15—Network Assisted Proximity Services High-Level Communication Flow

FIGS. 8-15 illustrate exemplary high-level (e.g., signaling protocol agnostic) communication flows relating to network assisted proximity services, according to some embodiments. In particular, the scenarios illustrated in and described with respect to FIGS. 8-15 may be representative of stage 2 level 3GPP specification of proximity services features, similar to those illustrated in and described with respect to 3GPP TS 23.303. It should be noted that while the illustrated communication flows represents possible communication flows which may be used in conjunction with provision of proximity services, numerous variations and alternatives are also possible, and the specific scenario and features of FIGS. 8-15 should not be considered limiting to the disclosure as a whole.

Figure 8:
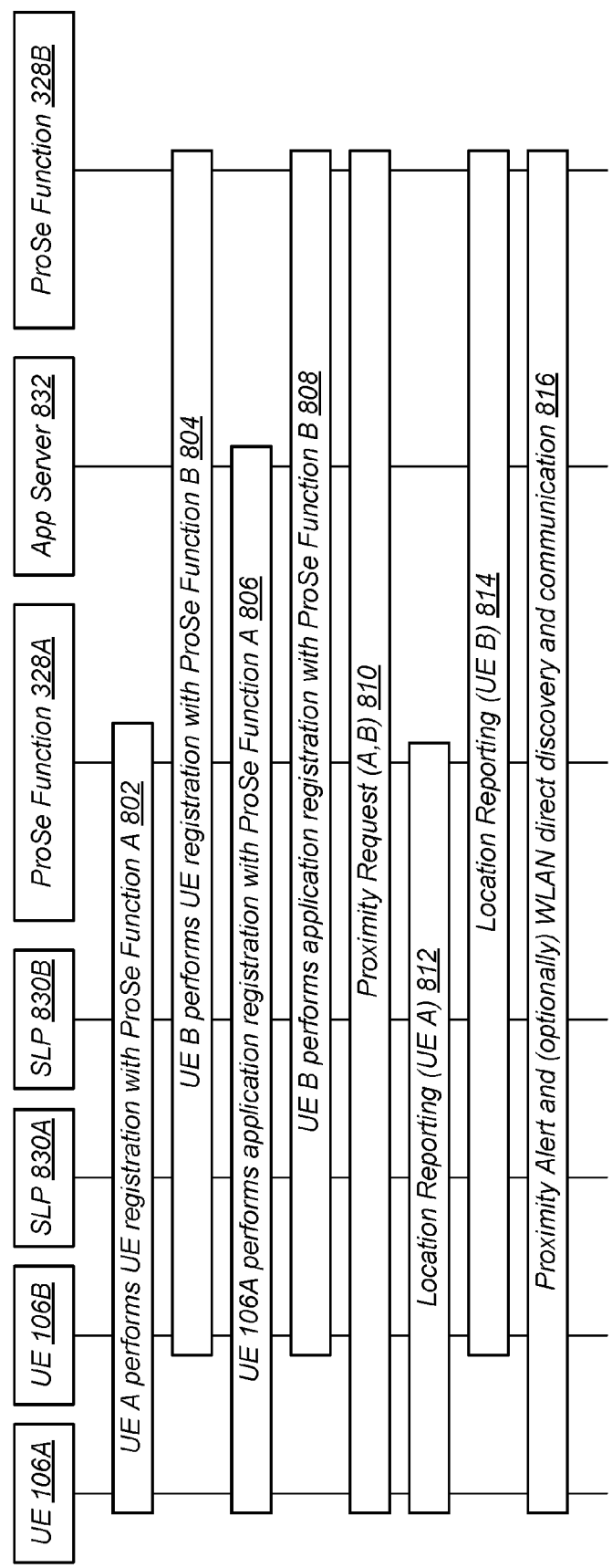
FIG. 8 illustrates an exemplary overall high-level communication flow for providing network-assisted proximity services between wireless devices, according to some embodiments.

FIG. 8 illustrates an exemplary overall high-level communication flow for providing network-assisted proximity services between UEs. In the exemplary scenario for which the communication flow is illustrated in FIG. 8, a first UE ('UE 106A') may be associated with a first cellular network/PLMN, which may include core network entities such as a ProSe Function ('ProSe Function 328A') and a SLP ('SLP 830A'), while a second UE ('UE 106B') may be associated with a second cellular network, which may similarly include core network entities such as a ProSe Function ('ProSe Function 328B') and a SLP ('SLP 830B').

As shown, as a first step toward providing proximity services, in 802 and 804 each UE 106 may perform UE registration for ProSe with the ProSe Function 328 residing in it's respective Home PLMN. Additionally, in 806 and 808, each UE 106 may perform application registration for ProSe with an application server 832 by way of the ProSe Function 328 residing in it's respective Home PLMN.

Once registration is complete, in 810 one of the UEs 106 (e.g., UE 106A) may make a proximity request for another UE 106 (e.g., UE 106B). For example, it may be requested that UE 106A be alerted when in proximity with UE 106B (possibly indicating a window of time during which the request is valid). In response, in 812 and 814 ProSe Function 328A may request location updates for UE 106A and UE 106B. These location updates can be periodic, based on a trigger, or a combination of both. To request location updates for UE 106A, ProSe Function 328A may contact SLP 830A. To request location updates for UE 106B, ProSe Function 328A may contact ProSe Function 328B, which may in turn request location updates for UE 106B from SLP 106B. The location information may be provided by way of OMA SUPL.

The locations of the UEs 106 may subsequently be reported to their respective ProSe Functions 328 intermittently. ProSe Function 328B may forward UE 106B's location updates to ProSe Function 328A based on the conditions set by ProSe Function 328A. Whenever ProSe Function 328A receives location updates for UE 106A and/or UE 106B, it may perform proximity analysis on UE 106A and UE 106B's locations.

When ProSe Function 328A detects that the UEs 106 are in proximity, in 816 it may inform UE 106A that UE 106B is in proximity and (optionally) provide UE 106A with assistance information designed to facilitate or expedite direct discovery and communication with UE 106B (e.g., according to WLAN direct and/or any other D2D communication scheme). ProSe Function 328A may also inform ProSe Function 328B, which may in turn inform UE 106B of the detected proximity and (optionally) provide UE 106B with assistance information designed to facilitate or expedite direct discovery and communication with UE 106A (e.g., similarly according to WLAN direct and/or any other D2D communication scheme).

Figure 9:
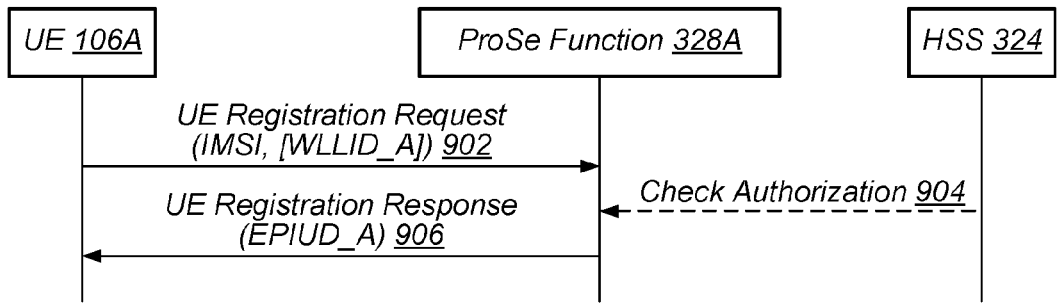
FIGS. 9-10 illustrate exemplary high-level communication flows for device and application registration for network-assisted proximity services, according to some embodiments.
Figure 10:
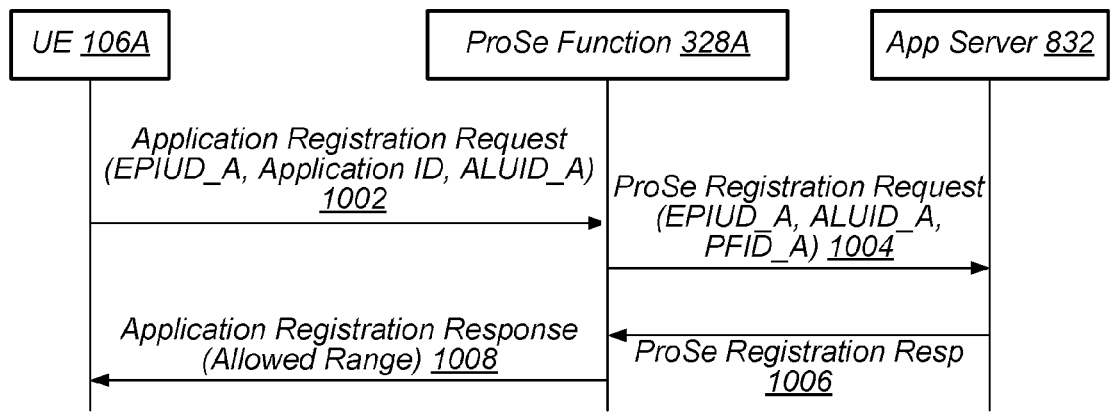

FIGS. 9-10 illustrate exemplary high-level communication flows for registering a UE 106 for network-assisted proximity services. To select ProSe Function 328A, UE 106A may construct a fully qualified domain name (FQDN) using the serving PLMN ID and rely on DNS translation to obtain the IP address of ProSe Function 328A. In 902, UE 106A may register with ProSe Function 328A by sending a UE Registration Request (IMSI, [WLLID_A]) message. If UE 106A intends to use network (e.g., EPC) support for WLAN direct discovery and communication and if it uses a permanent WLAN Link Layer ID, the message may also include UE 106A's permanent WLAN Link Layer ID (WLLID_A). Alternatively, the UE 106A may obtain a temporary WLAN Link Layer ID from the ProSe Function 328A as part of the Proximity Request procedure.

In 904, ProSe Function 328A may interact with the HSS 324 in order to authenticate the user and check whether the user is authorized for ProSe. Alternatively, all user settings related to authentication and authorization for ProSe may be configured locally in ProSe Function 328A, in which case the interaction with the HSS 324 may not be needed.

In 906, ProSe Function 328A may generate an EPC ProSe Subscriber ID for UE 106A (EPUID_A), store the EPUID_A together with the IMSI of UE 106A, and respond to UE 106A by sending a UE Registration Response (EPUID_A) message.

Once UE registration is complete, application registration may be performed, e.g., as shown in FIG. 10. In 1002, UE 106A may send an Application Registration Request (EPUID_A, Application ID, ALUID_A) message to ProSe Function 328A to register an application for ProSe. EPUID_A may be the EPC ProSe Subscriber ID for UE 106A. The Application ID may be used to identify the 3rd party App Server platform. ALUID_A may be user A's Application Layer User ID.

ProSe Function 328A may use EPUID_A to retrieve user A's profile, check that the requested application is on the stored list of authorized Application IDs, and (in 1004) send a ProSe Registration Request (ALUID_A, EPUID_A, PFID_A) message to the App Server 832 indicating that a user of this application (identified as ALUID_A) has requested to use ProSe for that application. PFID_A may be the ProSe Function ID of ProSe Function 328A. If the App Server 832 accepts the request, it may store the user's Application Layer User ID (ALUID_A) and EPC ProSe Subscriber ID (EPUID_A) together with the PFID_A.

In 1006, the App Server 832 may send a ProSe Registration Response message to ProSe Function 328A indicating that the registration was successful (or not successful, in the alternative).

In 1008, ProSe Function 328A may send an Application Registration Response (Allowed Range) message to UE 106A indicating that the registration was successful (or not successful, in the alternative). The Allowed Range parameter may include the set of range classes that are allowed for this application.

Figure 11:
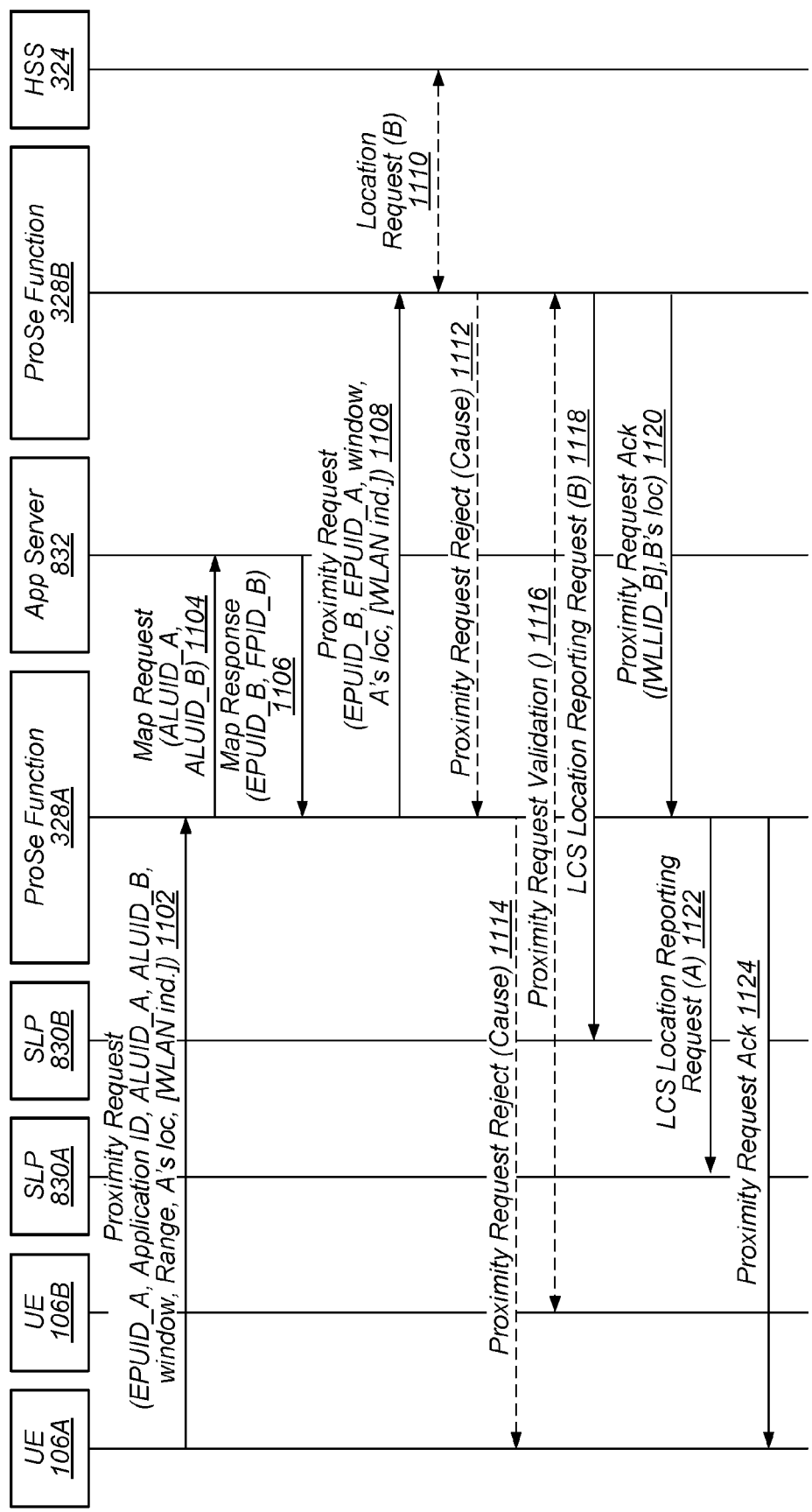
FIGS. 11-13 illustrate exemplary high-level communication flows for proximity requests, proximity alerts, and proximity request cancellations.

FIG. 11 illustrates an exemplary high-level communication flow for handling a proximity request. As shown, in 1102, UE 106A may send a Proximity Request (EPUID_A, Application ID, ALUID_A, ALUID_B, window, Range, A's location, [WLAN indication]) message to ProSe Function 328A. The Application ID parameter may identify the 3rd party App Server 832 platform. ALUID_A and ALUID_B may be the Application Layer User IDs for users A and B, respectively. The window parameter may indicate the time period during which the request is valid. Range may be a requested range class for this application chosen from the set of allowed range classes (e.g., specifying a proximity level, such as maximum distance between locations of UE 106A and UE 106B, which may trigger a proximity alert). A's location may be the current location of UE 106A with the best accuracy known by UE 106A. UE 106A may optionally request EPC support for WLAN direct discovery and communication with UE 106B by adding the WLAN indication.

In 1104, ProSe Function 328A may send a Map Request (ALUID_A, ALUID_B) message to the App Server 832, requesting that it provide the EPC ProSe Subscriber ID for the targeted user B. ProSe Function 328A may store the Application Layer User IDs (ALUID_A and ALUID_B) until the execution of the Proximity Alert procedure, the Proximity Request Cancellation procedure, or until the expiry of the time window during which the request is valid.

The App Server 832 may check user B's application-specific ProSe permissions, confirm that user A is allowed to discover user B, and in 1106 send a Map Response (EPUID_B PFID_B) message to ProSe Function 328A indicating user B's EPC ProSe Subscriber ID (EPUID_B) as well as the ProSe Function ID of ProSe Function 328B (PFID_B). ProSe Function 328A may store the EPUID_B and PFID_B until the execution of the Proximity Alert procedure, the Proximity Request Cancellation procedure, or until the expiry of the time window during which the request is valid.

In 1108, ProSe Function 328A may propagate the Proximity Request (EPUID_B, EPUID_A, window, A's location, [WLLID_A]) message to ProSe Function 328B, indicating a location update periodicity, (e.g., event-based) trigger, or both. A's location may be the current location of UE 106A provided in step 1102 (e.g., expressed in GAD shapes, such as defined in 3GPP TS 23.032 [3]). A WLAN indication may be included if UE 106A has requested EPC support for WLAN direct discovery and communication in step 1102.

Based on EPUID_B received in the previous step, ProSe Function 328B may retrieve subscriber B's record. In 1110, ProSe Function 328B may request UE 106B's last known location via the HSS 324. Based on the last known location of UE 106B obtained via the HSS 324 and UE 106A's location and time window provided by ProSe Function 328A in step 4, ProSe Function 328B may determine that the users are unlikely to enter proximity within the requested time window and reject the request by sending a Proximity Request Reject message towards UE 106A with an appropriate cause value (steps 1112 and 1114), in which case the remaining steps of the procedure may be skipped.

Otherwise, depending on UE 106B's ProSe profile, in 1116 UE 106B may be asked to confirm permission for the proximity request (e.g., user B may have temporarily disabled the ProSe function on UE 106B).

In 1118, ProSe Function 328B may request location reporting on UE 106B from SLP 830B, and in 1120 acknowledge the proximity request to ProSe Function 328A and provide UE 106B's current location (if known). The WLAN Link Layer ID of UE 106B (WLLID_B) may be included if UE 106A has requested EPC support for WLAN direct discovery and communication in step 1102 and if UE 106B uses a permanent WLAN Link Layer ID.

In 1122, ProSe Function 328A may request location reporting on UE 106A from SLP 830A. If UE 106A's current location is available and if UE 106B's location was included in step 7, ProSe Function 328A may decide to cancel the Proximity Request procedure, e.g., if it determines that the UEs 106 are unlikely to enter proximity within the requested time window. Otherwise, in 1124, ProSe Function 328A may acknowledge the proximity request to UE 106A.

Figure 12:
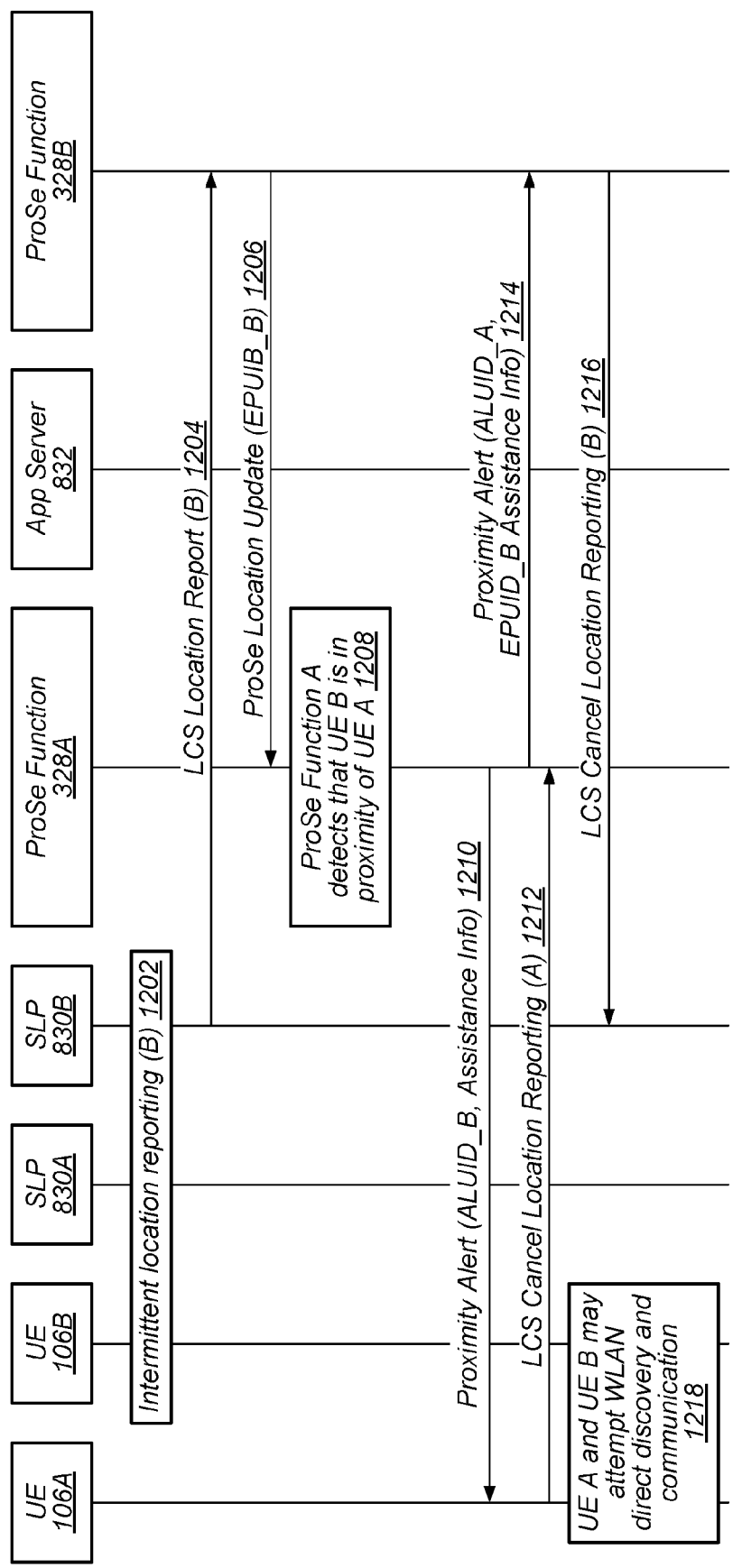

FIG. 12 illustrates an exemplary high-level communication flow for handling a proximity alert. As shown, in 1202 and 1204 the location of UE 106B may be intermittently reported to ProSe Function 328B, which in 1206 may forward the location information to ProSe Function 328A. When (e.g., in 1208) ProSe Function 328A detects that the two UEs 106 are in proximity (e.g., based on the requested discovery range class), ProSe Function 328A may then in 1210 alert UE 106A by sending a Proximity Alert (ALUID_B, Assistance Information) message. ALUID_B may be the Application Layer User ID of user B. The message may optionally include Assistance Information for WLAN direct discovery and communications with UE 106B. In 1212, ProSe Function 328A may cancel location reporting on UE 106A from SLP 830A.

In 1214, ProSe Function 328A may also request ProSe Function 328B to send a Proximity Alert (ALUID_A, Assistance Information) message to UE 106B. ALUID_A is the Application Layer User ID of user A. The message optionally includes Assistance Information for WLAN direct discovery and communication with UE 106A. Alternatively, since at least in some instances UE 106B may not have submitted a proximity request with respect to UE 106A, a proximity alert message may not be sent to UE 106B. In 1216 ProSe Function 328B may also cancel location reporting on UE 106B from SLP 830B.

Having received a proximity alert, in 1218 UE 106A and UE 106B may then (optionally) engage in WLAN direct discovery and Communication, and/or otherwise initiate proximity-related app activity.

It should be noted that the WLAN interface in the UEs 106 may not need to be turned on until step 1218 in which the WLAN direct discovery and Communication are performed. Additionally, it should be noted that while the 'assistance information' may be designed to expedite WLAN direct discovery and communication, the specific content of the assistance information may depend on the technology used on the WLAN direct link. The content in the assistance information may be dynamically generated by ProSe Function 328A, with the possible exception of WLLID_B, e.g., in case UE 106B supports only permanent WLLID.

Figure 13:
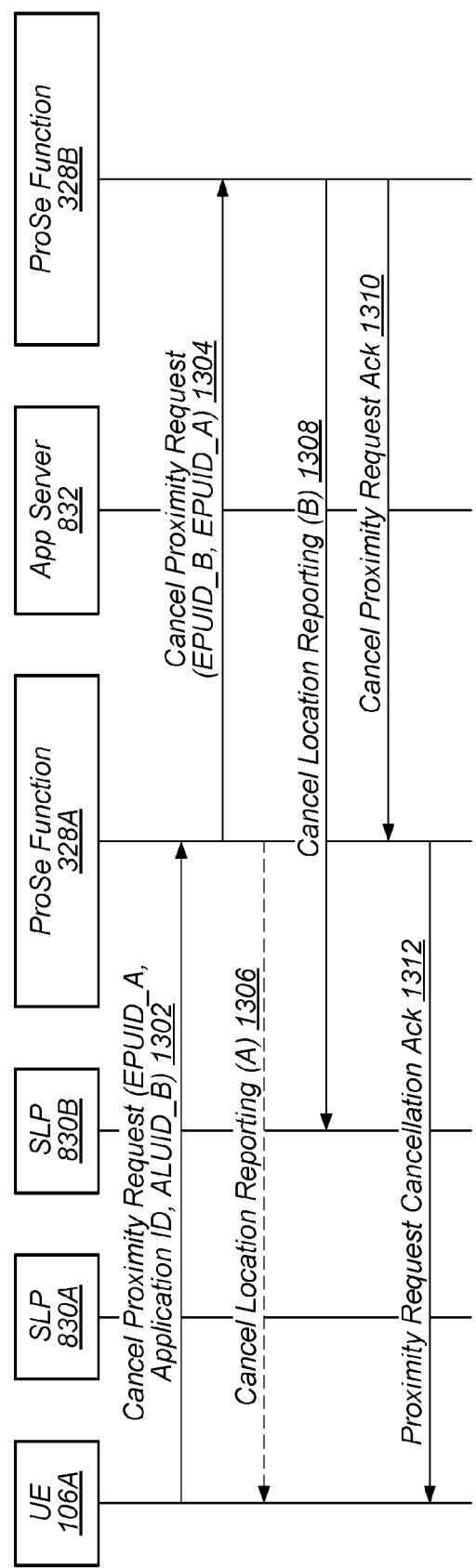

FIG. 13 illustrates an exemplary high-level communication flow for handling a proximity request cancellation. As shown, in 1302 UE 106A may send a Cancel Proximity Request (EPUID_A, Application ID, ALUID_B) to Prose Function 328A. In 1304 Prose Function 328A may then propagate the cancel Proximity Request (EPUID_B, EPUID_A) message to ProSe Function 328B based on the stored PFID B information.

In 1306, ProSe Function 328A may then cancel location reporting on UE 106A from SLP 830A. In 1308, ProSe Function 328B may also cancel location reporting on UE 106B from SLP 830B, and in 1310 may acknowledge the proximity request cancellation to ProSe Function 328A. In 1312 ProSe Function 328A may then acknowledge the proximity request cancellation to UE 106A.

Figure 14:
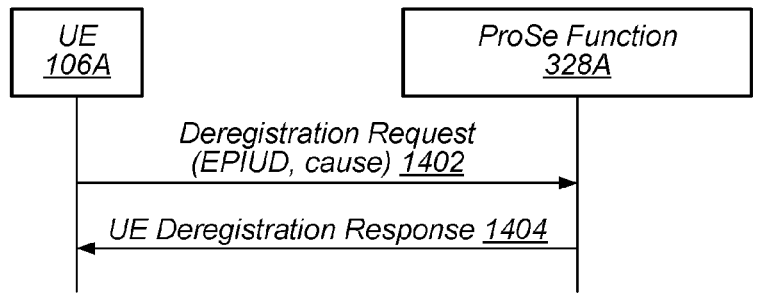
FIGS. 14-15 illustrate exemplary high-level communication flows for device deregistration for network-assisted proximity services.
Figure 15:
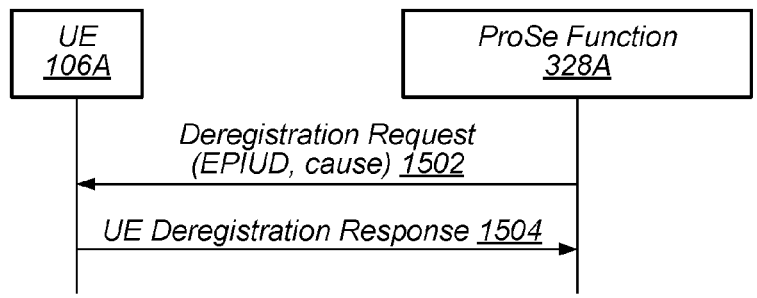

FIGS. 14-15 illustrate exemplary high-level communication flows for deregistering a UE 106 for network-assisted proximity services. It may be the case that at any time, either a UE 106 (e.g., in step 1402, as shown in FIG. 14) or a ProSe Function 328 (e.g., in step 1502, as shown in FIG. 15) may decide to deregister the UE 106 by sending a UE Deregistration Request (EPUID, cause) message. The ProSe function 328 (e.g., in step 1404, in the scenario of FIG. 14) or the UE 106 (e.g., in step 1504, in the scenario of FIG. 15) may acknowledge the deregistration request by sending a UE Deregistration Response message.

Figure 16:
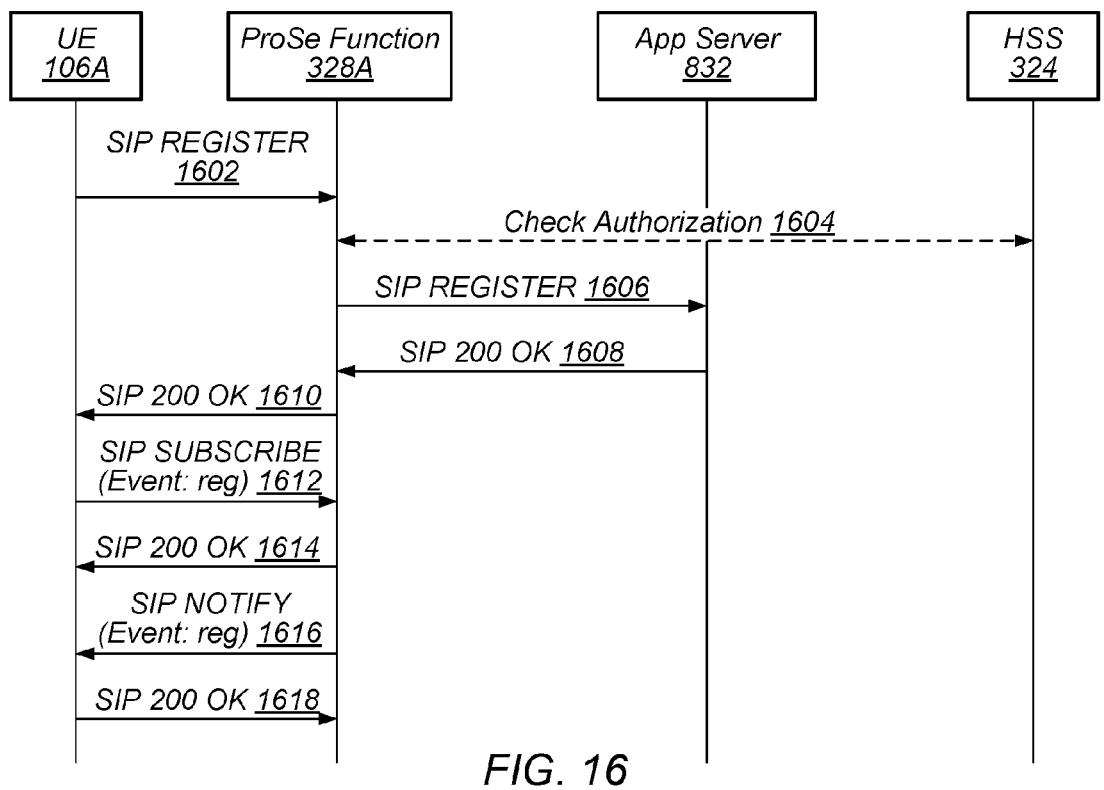
FIG. 16 illustrates an exemplary communication flow for device and application registration for network-assisted proximity services using SIP.
Figure 17:
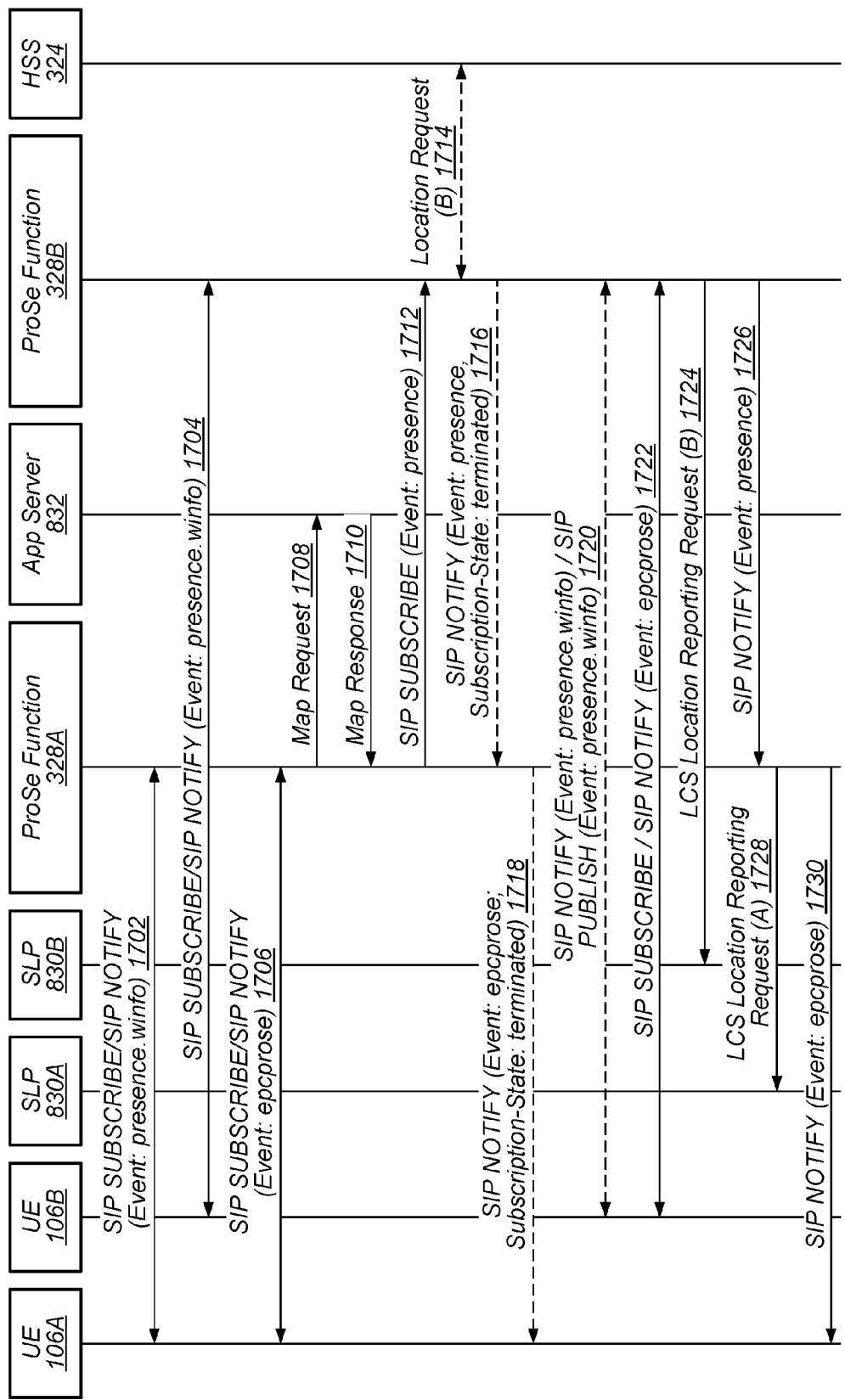
FIGS. 17-19 illustrate exemplary communication flows for proximity requests, proximity alerts, and proximity request cancellations using SIP.
Figure 18:
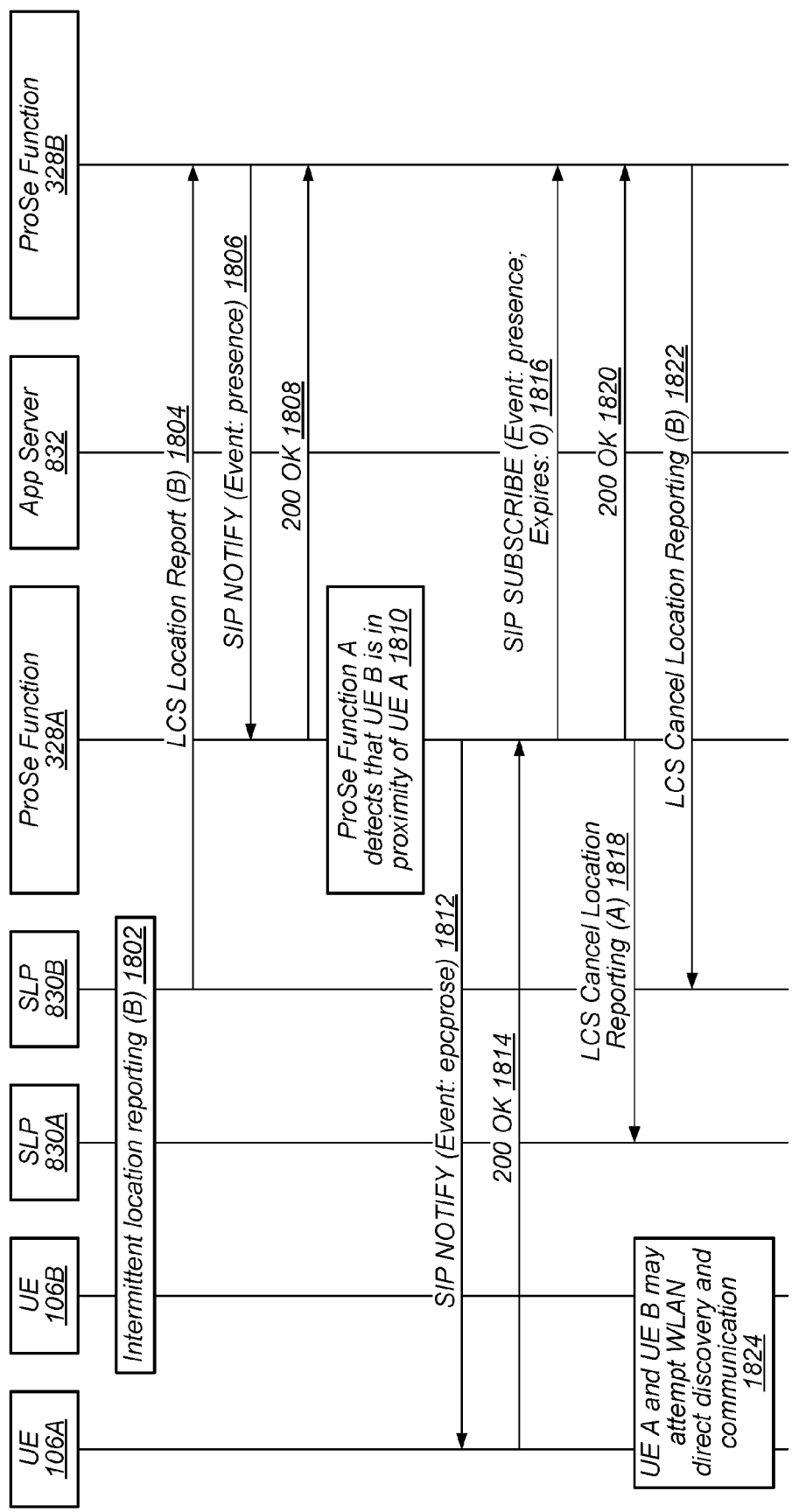
Figure 19:
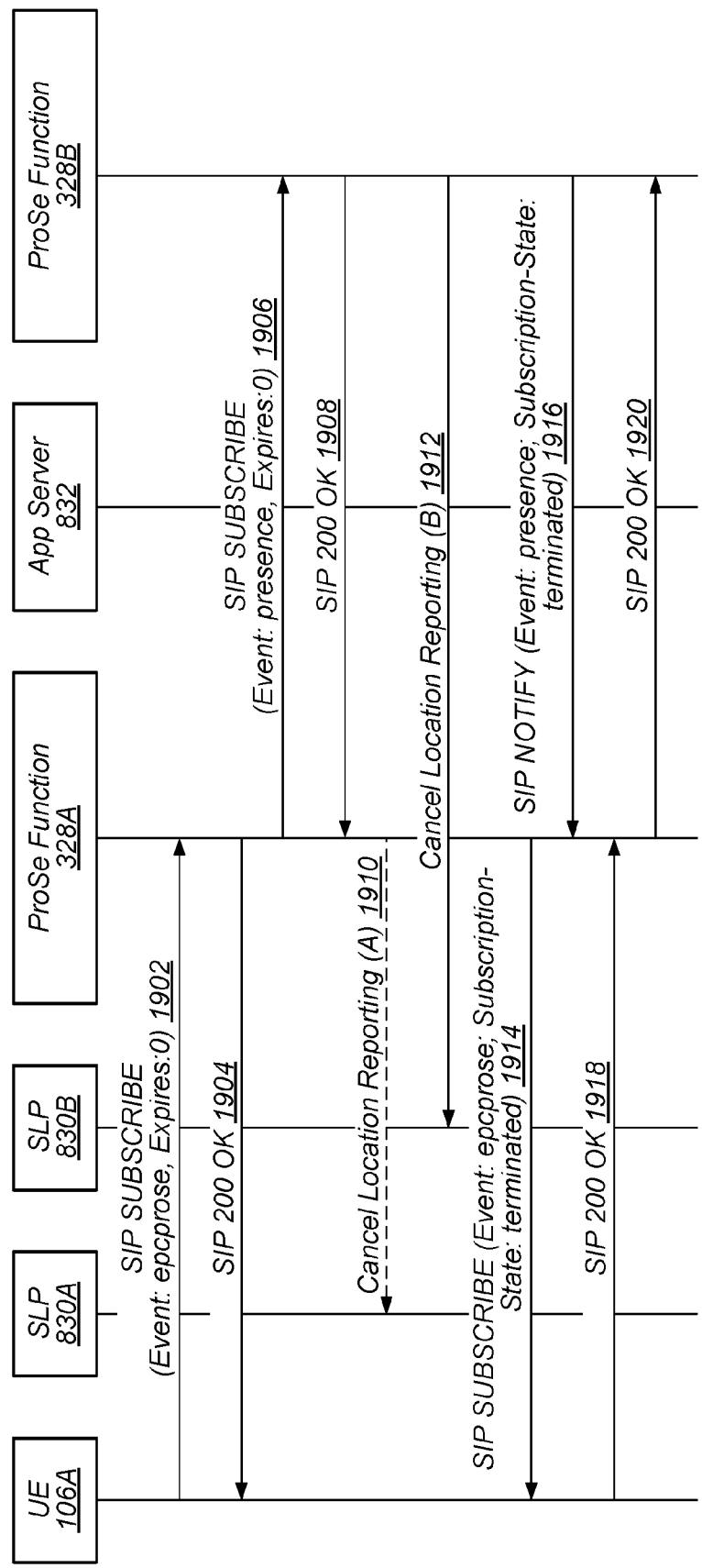

FIGS. 16-21—Network Assisted Proximity Services Registration and Deregistration Using SIP FIGS. 16-21 illustrate exemplary communication flows for registering and deregistering a UE for network-assisted proximity services as well as for performing proximity request, proximity alert, and proximity request cancellation procedures using SIP, according to some embodiments. In particular, the registrations procedures in the exemplary scenarios of FIGS. 16 and 20-21 may be implemented to register for 3GPP EPC-level ProSe discovery using the SIP REGISTER request according to IETF RFC 3261 and the registration event package according to IETF RFC 3680. Additionally, whereas the proximity request, proximity alert, and proximity request cancellation procedures such as illustrated in and described in a protocol-agnostic manner with respect to FIGS. 11-13 may be modeled as scenarios in which an entity (e.g., a UE) requests asynchronous notification of events from another entity (e.g., a ProSe function), FIGS. 17-19 illustrate exemplary implementation scenarios in which the SIP-Specific Event Notification framework defined in IETF RFC 6665 is used to satisfy the Proximity Request and Alert procedures. Such frameworks may be provided in conjunction with stage 3 level 3GPP specification of proximity services features. It should be noted that while the illustrated communication flows represent possible communication flows which may be used in conjunction with provision of proximity services, numerous variations and alternatives are also possible, and the specific scenarios and features of FIGS. 16-21 should not be considered limiting to the disclosure as a whole.

The registration process may include the ProSe function 328A acting as a SIP registrar for the registration process and a SIP User Agent (UA) for the notifier of registration event information, the UE 106A acting as a SIP UA. The UE 106A may use a temporary public user identity (SIP URI) and the home network domain name generated from the UE 106A's IMSI and issue the REGISTER request to the ProSe function 328A.

The ProSe function 328A may register the temporary public user identity and reserve an EPUID. The EPUID may be returned to the UE 106A in the P-Associated-URI header field (e.g., as defined in IETF RFC 7315) of the 200 OK response of the REGISTER request. The temporary public user identity may not be used in subsequent transactions.

The ProSe Function 328A may also issue a third-party REGISTER request to the App Server 832 informing the App Server 832 about the UE 106A's registration state. Additionally, the UE 106A may subscribe to the reg event package at the ProSe Function 328A by sending a SUBSCRIBE (Event:reg) request to learn about network-initiated reregistration events at ProSe Function 328A.

FIG. 16 illustrates an exemplary communication flow for performing UE and application registration using SIP. In 1602, UE 106A may construct a SIP REGISTER request, e.g., according to RFC 3261. The Request-URI may be filled with the home network domain name of the ProSe Function 328A derived from the IMSI. The To and the From header field may be set to a temporary public user identity derived from the IMSI (e.g., as defined in 3GPP TS 23.003). The body of the REGISTER request may include the Application ID and ALUID_A. If the UE 106A intends to use EPC support for WLAN direct discovery and communication and if it uses a permanent WLAN Link Layer ID, the body of the REGISTER request may also include UE 106A's permanent WLAN Link Layer ID (WLLID_A).

In 1604, ProSe Function 328A may interact with the HSS 324 in order to authenticate the user and check whether the user is authorized for ProSe. Alternatively, all user settings related to authentication and authorization for ProSe may be configured locally in ProSe Function 328A, in which case the interaction with the HSS 324 may not be needed.

ProSe Function 328A may check that the requested application is on the stored list of authorized Application IDs. In case the application is authorized, in 1606 ProSe Function 328A may send a third-party REGISTER request to the App Server 832. The Request-URI may be filled with an FQDN of the App Server 832 derived from the Application ID, while the From header field may include PFID_A, and the To header field may contain ALUID_A.

If the App Server 832 accepts the request, it may store ALUID_A and EPUID_A together with the PFID_A. In 1608, the App Server 832 may send a 200 OK response to ProSe Function 328A indicating that the registration was successful.

ProSe Function 328A may generate an EPC ProSe Subscriber ID for UE 106A (EPUID_A), store the EPUID_A together with user's IMSI and respond to UE 106A by sending a 200 OK response (step 1610) indicating that the registration was successful. The reserved EPUID_A may be included in the P-Associated-URI header field (which, as noted above, may be defined in IETF RFC 7315). The body of the 200 OK response may include the Allowed Range parameter.

UE 106A may subscribe to the 'reg' event package for the EPUID_A registered at ProSe Function 328A, e.g., in order to learn about network-initiated reregistration events at ProSe Function 328A, by sending a SUBSCRIBE (Event: reg) request (step 1612). ProSe Function 328A may confirm the subscription by sending a 200 OK response (step 1614).

Prose Function 328A may issue an immediate NOTIFY request (step 1616) to UE 106A informing UE 106A about the successful registration. UE 106A may confirm the subscription by sending a 200 OK response (step 1618).

According to RFC 6665, a subscriber is a user agent that receives NOTIFY requests from notifiers; these NOTIFY requests contain information about the state of a resource in which the subscriber is interested. Subscribers typically also generate SUBSCRIBE requests and send them to notifiers to create subscriptions.

Further according to RFC 6665, a notifier is a user agent that generates NOTIFY requests for the purpose of notifying subscribers of the state of a resource. Notifiers typically also accept SUBSCRIBE requests to create subscriptions.

FIG. 17 illustrates an exemplary communication flow for handling proximity requests using SIP. Note that for the sake of overall clarity, acknowledgements (e.g., SIP 200 OK messages) are not shown in FIG. 17, however, such messages may nonetheless be used in conjunction with SIP messages.

RFC 6665 is a framework that specifies a new event package that defines a set of state information to be reported by a notifier to a subscriber. Event packages also define further syntax and semantics that are based on the framework defined in RFC 6665.

Accordingly, a SIP event package (Event: epcprose) may be specified for Proximity Request and Alert on the PC3 reference point. In such a framework, the UE may be a SIP Subscriber, and the ProSe function may be a SIP Notifier.

The state represented by the event package may be the proximity of two particular UEs. The Notifier may generate a (final) NOTIFY request when the two UEs enter into proximity. The Notifier may not reveal the actual location of the UE(s).

Additionally, the presence event package (RFC 3856) may be used on the PC6 reference point to exchange the UE's current location information between the different ProSe functions.

The presence event package can be used to carry location information encoded in a PIDF-LO object specified in RFC 4119. Appropriate filtering to limit/specify the number of asynchronous location notifications can be applied as specified in RFC 6447.

As shown, UE 106A may generate a SIP SUBSCRIBE request (step 1706) for the epcprose event package and send it to ProSe Function 328A. The From header field may include ALUID_A, the To header field may include ALUID_B, and the Expires header field may include the window parameter. The EPUID_A, Application ID, Range, A's location, [WLAN indication]) may be embedded in the body of the SUBSCRIBE request. Prior to subscribing to the epcprose event, both UEs 106 may subscribe (steps 1702 and 1704) to watcher information (presence.winfo template package according to RFC 3857) to monitor the state of their own presence subscriptions. Note that this may be an optional or a required step, depending (among possible factors) on user profile settings stored in the HSS 324.

ProSe Function 328A may send a Map Request (ALUID_A, ALUID_B) message (step 1708) to the App Server 832, requesting that it provide the EPC ProSe Subscriber ID for the targeted user B. ProSe Function 328A may store the Application Layer User IDs (ALUID_A and ALUID_B) until the execution of the Proximity Alert procedure, the Proximity Request Cancellation procedure, or until the expiry of the time window during which the request is valid.

The App Server 832 may check user B's application-specific ProSe permissions, confirm that user A is allowed to discover user B, and send a Map Response (EPUID_B PFID_B) message (step 1710) to ProSe Function 328A indicating user B's EPC ProSe Subscriber ID (EPUID_B) as well as the ProSe Function ID of ProSe Function 328B (PFID_B). ProSe Function 328A may store the EPUID_B and PFID_B until the execution of the Proximity Alert procedure, the Proximity Request Cancellation procedure, or until the expiry of the time window during which the request is valid.

ProSe Function 328A may generate a SIP SUBSCRIBE request (step 1712) for the presence event package (RFC 3856) to monitor the location of UE 106B on behalf of UE 106A and send it to ProSe Function 328B. The From header field may include EPUID_A, the To header field may include EPUID_B, and the Expires header field may include the window parameter. UE 106A's location and [WLAN indication] may be embedded in the body of the SUBSCRIBE request. The body of the SUBSCRIBE request may also include a filter according to RFC 6447 to specify the location update periodicity, trigger, or both.

Based on EPUID_B received in the previous step, ProSe Function 328B may retrieve subscriber B's record. ProSe Function 328B may request UE 106B's last known location via the HSS 324 (step 1714). Based on the last known location of UE 106B obtained via the HSS 324 and UE 106A's location and time window provided by ProSe Function 328A in step 4, ProSe Function 328B may determine that the users are unlikely to enter proximity within the requested time window and reject the request by sending a SIP NOTIFY request in step 1716 to terminate the subscription. The Event header field may include the value of "presence" and the Subscription-State header field parameter field may include the value of "terminated". After ProSe Function 328A receives this NOTIFY request, it also terminates UE 106A's subscription to the epcprose event package (step 1718). The remaining steps of the procedure may be skipped in this case.

Otherwise, ProSe Function 328B may generate and send a watcherinfo notification (step 1720) to UE 106B according to RFC 3857 informing UE 106B about UE 106A's subscription for the presence event package. Depending for example on pre-authorized settings and/or previous authorizations, UE 106B may or may not need to authorize UE 106A's subscription. If needed, UE 106B may approve or decline UE 106A's subscription by sending a SIP PUBLISH request according to RFC 3903 including a simple approve/decline authorization setting in the body of the PUBLISH request. In case UE 106B is also interested to receive Proximity Alerts when UE 106A comes into proximity, UE 106B can generate a SIP SUBSCRIBE request (step 1722) for the epcprose event package and send it to ProSe Function 328B.

ProSe Function 328B may request location reporting on UE 106B from SLP 830B (step 1724). ProSe Function 328B may provide UE 106B's current location (if known) to Prose Function 328A via a SIP NOTIFY request (Event: presence) (step 1726). The location information may be encoded in a PIDF-LO object, e.g., as specified in RFC 4119. The WLAN Link Layer ID of UE 106B (WLLID_B) may be included in the presence information if UE 106A has requested EPC support for WLAN direct discovery and communication in step 1702 and if UE 106B uses a permanent WLAN Link Layer ID. It may be the case that no other presence information is provided. ProSe Function 328A may also request location reporting on UE 106A from SLP 830A (step 1728). Additionally (assuming UE 106A and UE 106B are not already in proximity) in 1730 ProSe Function 328A may generate a SIP NOTIFY request (Event:epcprose) to UE 106A informing UE 106A that UE 106B is outside of the Range parameter specified by UE 106A. This information can be encoded as an Event header field parameter ("out_of_proximity") or in the body of the NOTIFY request, as desired.

FIG. 18 illustrates an exemplary communication flow for handling proximity alerts using SIP. As shown, the location of UE 106B may be intermittently reported to ProSe Function 328B, which may forward the location information to ProSe Function 328A (steps 1802, 1804, 1806). When ProSe Function 328A detects that the two UEs 106 are in proximity (e.g., based on the requested discovery range class) (step 1810), Prose Function 328A may alert UE 106A by sending a NOTIFY request (Event: epcprose) to UE 106A (step 1812). This information may be encoded as an Event header field parameter (e.g., "in_proximity", as opposed to "out_of_proximity") or in the body of the NOTIFY request. The optional WLAN Assistance Information may also be embedded in the body of the NOTIFY request. UE 106A may confirm the notification by sending a 200 OK response (step 1814). ProSe Function 328A may cancel location reporting on UE 106A from SLP 830A (step 1818).

ProSe Function 328A may also terminate UE 106A's presence subscription at ProSe Function 328B (step 1816). ProSe Function 328B may confirm the subscription cancellation by sending a 200 OK response (step 1820). ProSe Function 328B may cancel location reporting on UE 106B from SLP 830B (step 1822).

Having received a proximity alert, UE 106A and UE 106B may then (optionally) engage in WLAN direct discovery and Communication, and/or otherwise initiate proximity-related app activity (step 1824).

FIG. 19 illustrates an exemplary communication flow for handling proximity request cancellations using SIP. As shown, if UE 106A decides to cancel its previous Proximity Request (e.g., based on user input and/or any of various other possible factors), UE 106A may generate a SIP SUBSCRIBE request (step 1902) including an Expires header field with the value of "0" for the epcprose event package and send it to ProSe Function 328A. The From header field may include ALUID_A, and the To header field may include ALUID_B. ProSe Function 328A may confirm the cancellation by sending a 200 OK response (step 1904).

ProSe Function 328A may generate a SIP SUBSCRIBE request (step 1904) for the presence event package including an Expires header field with the value of "0" and send it to Prose Function 328B to cancel the presence subscription at ProSe Function 328B. The From header field may include EPUID_A, and the To header field may include EPUID_B. ProSe Function 328B may confirm the cancellation by sending a 200 OK response (step 1908).

Additionally, ProSe Function 328A may cancel location reporting on UE 106A from SLP 830A (step 1910), and ProSe Function 328B may cancel location reporting on UE 106B from SLP 830B (step 1912).

ProSe Function 328B may issue a final SIP NOTIFY request (step 1916) to ProSe Function 328A indicating the subscription has been terminated. The Event header field may include the value of "presence" and the Subscription-State header field parameter field may include the value of "terminated". ProSe Function 328A may confirm the notification by sending a 200 OK response (step 1920) to ProSe Function 328B.

Additionally, ProSe Function 328A may issue a final SIP NOTIFY request (step 1914) to UE 106A indicating the subscription has been terminated. The Event header field may include the value of "epcprose" and the Subscription-State header field parameter field may include the value of "terminated". UE 106A may confirm the notification by sending a 200 OK response (step 1918) to ProSe Function 328A.

Figure 20:
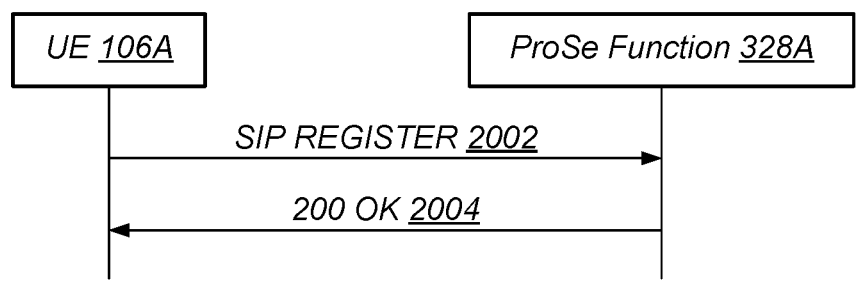
FIGS. 20-21 illustrate exemplary communication flows for device deregistration for network-assisted proximity services using SIP.
Figure 21:
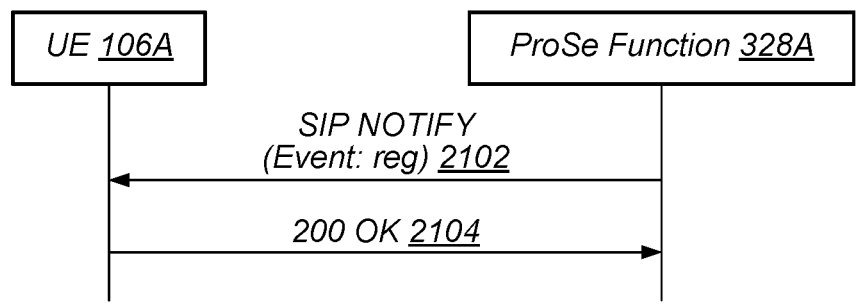

FIGS. 20-21 illustrate exemplary communication flows for performing UE-initiated and network-initiated UE deregistration using SIP respectively. In the UE-initiated deregistration procedure illustrated in FIG. 20, UE 106A may construct a SIP REGISTER request and send it to ProSe Function 328A. The SIP REGISTER request (step 2002) may include an Expires header field with the value of "0" to indicate deregistration. The ProSe Function 328A may confirm the deregistration by sending a 200 OK response (step 2004).

In the network-initiated deregistration procedure illustrated in FIG. 21, the Prose Function 328A may construct a NOTIFY request (step 2102) for the registration event package to UE 106A informing UE 106A about network-initiated deregistration. ProSe Function 328A may set the aor attribute within the <registration> element to EPUID_A and the <uri> sub-element inside the <contact> sub-element of the <registration> element to the respective contact address provided by the UE 106A; set the state attribute within the <registration> element to "terminated" and the state attribute within each <contact> element belonging to this UE 106A to "terminated"; and the event attribute within each <contact> element belonging to this UE 106A to either "unregistered", or "deactivated" if the ProSe Function 328A expects the UE 106A to reregister or "rejected" if the ProSe Function 328A does not expect the UE 106A to reregister. UE 106A may confirm the network-initiated deregistration by sending a 200 OK response (step 2104).

In the following further exemplary embodiments are provided.

One set of embodiments may include a method for registering a wireless user equipment (UE) device with a proximity services (ProSe) function of a cellular core network, comprising: the UE sending a session initiation protocol (SIP) register request to the ProSe function, wherein the SIP register request comprises application identification information for an application in conjunction with which to register the UE for proximity services; wherein the ProSe function sends a third party SIP register request on behalf of the UE to an application server corresponding to the application based at least in part on receiving the SIP register request from the UE; wherein the ProSe function receives a SIP 200 OK response from the application server in response to the third party SIP register request; the UE receiving a SIP 200 OK response from the ProSe function in response to the SIP register request; the UE sending a SIP subscribe request subscribing to a registration event package to the ProSe function; the UE receiving a SIP 200 OK response from the ProSe function in response to the SIP subscribe request confirming the subscription; the UE receiving a SIP notify request from the ProSe function informing the UE that registration is successful; and the UE sending a SIP 200 OK response to the ProSe function UE in response to the SIP notify request.

According to some embodiments, the SIP register request comprises a temporary public user identity in a the form of a SIP URI based on an international mobile subscriber identity (IMSI) of the UE, wherein the ProSe function generates a ProSe subscriber identifier for the UE based on receiving the SIP register request from the UE and includes the ProSe subscriber identifier for the UE in the P-Associated-URI header field of the SIP 200 OK response sent to the SIP register request to the UE.

An additional exemplary embodiment may include a method for deregistering a wireless user equipment (UE) device with a proximity services (ProSe) function of a cellular core network, comprising: the UE sending a session initiation protocol (SIP) register request to the ProSe function, wherein the SIP register request comprises an Expires header field with the value of "0" to indicate deregistration of the UE for ProSe; and the UE receiving a SIP 200 OK response from the ProSe function in response to the SIP register request confirming the deregistration.

A further exemplary embodiment may include a method for deregistering a wireless user equipment (UE) device with a proximity services (ProSe) function of a cellular core network, comprising: the UE receiving a session initiation protocol (SIP) notify request from the ProSe function, wherein the SIP notify request corresponds to a registration event package, wherein the SIP notify request indicates deregistration of the UE for ProSe to the UE; and the UE sending a SIP 200 OK response to the ProSe function in response to the SIP notify request confirming the deregistration.

Yet another exemplary embodiment may include a method for handling network-assisted proximity requests between a first wireless user equipment (UE) device and a first proximity services (ProSe) function of a cellular core network, comprising: the first UE sending a session initiation protocol (SIP) subscribe request to the first ProSe function for a epcprose event package as a proximity request corresponding to a second UE; wherein the first ProSe Function propagates the proximity request by sending a SIP subscribe request to a second ProSe function for a presence event package corresponding to the second UE; the first UE receiving a SIP notify request from the first ProSe function acknowledging the proximity request.

According to some embodiments, the SIP subscribe request comprises an Expires header field with the value of "0" to indicate cancellation of the proximity request corresponding to the second UE, wherein the SIP notify request indicates that the subscription state of the first UE is terminated to acknowledge the proximity request cancellation.

In some embodiments, the preceding exemplary method further comprises: the first UE receiving a SIP notify request from the first ProSe function for the epcprose event package indicating that the second UE is in proximity to the first UE as a proximity alert corresponding to the second UE, wherein the first ProSe function sent SIP notify request for the epcprose event package based on receiving a SIP notify request from the second ProSe function for the presence event package and determining that the second UE is in proximity to the first UE.

A further exemplary embodiment includes a method for registering a wireless user equipment (UE) device with a proximity services (ProSe) function of a cellular core network, comprising: the ProSe function receiving a session initiation protocol (SIP) register request from the UE, wherein the SIP register request comprises application identification information for an application in conjunction with which to register the UE for proximity services; the ProSe function sending a third party SIP register request on behalf of the UE to an application server corresponding to the application based at least in part on receiving the SIP register request from the UE; the ProSe function receiving a SIP 200 OK response from the application server in response to the third party SIP register request; the ProSe function sending a SIP 200 OK response to the UE in response to the SIP register request based on receiving the SIP 200 OK response from the application server; the ProSe function receiving a SIP subscribe request subscribing to a registration event package from the UE; the ProSe function sending a SIP 200 OK response to the UE in response to the SIP subscribe request confirming the subscription; the ProSe function sending a SIP notify request to the UE informing the UE that registration is successful; and the ProSe function receiving a SIP 200 OK response from the UE in response to the SIP notify request.

In some embodiments, the SIP register request comprises a temporary public user identity based on an international mobile subscriber identity (IMSI) of the UE, wherein the ProSe function generates a ProSe subscriber identifier for the UE based on receiving the SIP register request from the UE and includes the ProSe subscriber identifier for the UE in the P-Associated-URI header field of the SIP 200 OK response sent to the SIP register request to the UE.

In some embodiments, the preceding exemplary method further comprises: the ProSe function checking the UE's authorization and/or authenticating the UE for ProSe with a home subscriber server corresponding to the UE.

Yet another exemplary embodiment may include a method for deregistering a wireless user equipment (UE) device with a proximity services (ProSe) function of a cellular core network, comprising: the ProSe function receiving a session initiation protocol (SIP) register request from the UE, wherein the SIP register request comprises an Expires header field with the value of "0" to indicate deregistration of the UE for ProSe; and the ProSe function sending a SIP 200 OK response to the UE in response to the SIP register request confirming the deregistration.

Still another exemplary embodiment may include a method for deregistering a wireless user equipment (UE) device with a proximity services (ProSe) function of a cellular core network, comprising: the ProSe function sending a session initiation protocol (SIP) notify request to the UE, wherein the SIP notify request corresponds to a registration event package, wherein the SIP notify request indicates deregistration of the UE for ProSe to the UE; and the ProSe function receiving a SIP 200 OK response from the UE in response to the SIP notify request confirming the deregistration.

A still further exemplary embodiment may include a method for handling network-assisted proximity requests between a first wireless user equipment (UE) device and a first proximity services (ProSe) function of a cellular core network, comprising: the first ProSe function receiving a session initiation protocol (SIP) subscribe request from the first UE for a epcprose event package as a proximity request corresponding to a second UE; the first ProSe Function propagating the proximity request by sending a SIP subscribe request to a second ProSe function for a presence event package corresponding to the second UE; the first ProSe Function sending a SIP notify request to the first UE acknowledging the proximity request.

In some embodiments, the SIP subscribe request comprises an Expires header field with the value of "0" to indicate cancellation of the proximity request corresponding to the second UE, wherein the SIP notify request indicates that the subscription state of the first UE is terminated to acknowledge the proximity request cancellation.

In some embodiments, the preceding exemplary method further comprises: the first ProSe function receiving a SIP notify request from the second ProSe function for the presence event package comprising location information for the second UE; the first ProSe function receiving location information for the first UE; the first ProSe function determining that the second UE is in proximity to the first UE based on location information for the second UE and the location information for the first UE; the first ProSe function sending a SIP notify request to the first UE for the epcprose event package indicating that the second UE is in proximity to the first UE as a proximity alert corresponding to the second UE.

An additional exemplary set of embodiments may include a wireless user equipment (UE) device, comprising: one or more radios, coupled to one or more antennas configured for wireless communication; and an processing element operably coupled to the one or more radios; wherein the UE is configured to implement any or all parts of any of the methods of the preceding examples.

Another exemplary set of embodiments may include a Proximity Services (ProSe) function, comprising: one or more network ports configured to communicate with one or more cellular network elements and/or other devices; and an processing element operably coupled to the one or more network ports; wherein the ProSe function is configured to implement any or all parts of any of the methods of the preceding examples.

A further exemplary set of embodiments may include a non-transitory computer accessible memory medium comprising program instructions which, when executed at a device, cause the device to implement any or all parts of any of the methods of the preceding examples.

A still further exemplary set of embodiments may include a computer program comprising instructions for performing any or all parts of any of the methods of the preceding examples.

Yet another exemplary set of embodiments may include an apparatus comprising means for performing any or all of the method elements of any of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless user equipment (UE) device, comprising:
wireless communication circuitry; and
one or more processing elements coupled to the wireless communication circuitry, wherein the one or more processing elements are configured to:
register for cellular network assisted proximity services with a proximity services (ProSe) function of a cellular core network using session initiation protocol (SIP) signaling, wherein registering for cellular network assisted proximity services comprises:
sending a SIP register request to the ProSe function, wherein the SIP register request comprises application identification information for an application in conjunction with which to register the UE device for proximity services;
receiving a SIP 200 OK response from the ProSe function in response to the SIP register request;
sending a SIP subscribe request subscribing to a registration event package to the ProSe function;
receiving a SIP 200 OK response from the ProSe function in response to the SIP subscribe request confirming the subscription;
receiving a SIP notify request from the ProSe function informing the UE device that registration of the UE for proximity services is successful; and
sending a SIP 200 OK response to the ProSe function in response to the SIP notify request; and
obtain proximity services from the ProSe function of the cellular core network.

2. The wireless UE of claim 1, wherein the one or more processing elements are further configured to:
de-register for cellular network assisted proximity services with the ProSe function of the cellular core network using SIP signaling, wherein de-registering for cellular network assisted proximity services comprises:
receiving a session initiation protocol (SIP) notify request from the ProSe function, wherein the SIP notify request corresponds to a registration event package, wherein the SIP notify request indicates de-registration of the UE device for proximity services to the UE device; and
sending a SIP 200 OK response to the ProSe function in response to the SIP notify request confirming the de-registration.

3. The wireless UE of claim 1, wherein the one or more processing elements are further configured to:
de-register for cellular network assisted proximity services with the ProSe function of the cellular core network using SIP signaling, wherein de-registering for cellular network assisted proximity services comprises:
sending a session initiation protocol (SIP) register request to the ProSe function, wherein the SIP register request comprises an Expires header field with a value of "0" to indicate de-registration of the UE device for cellular network assisted proximity services; and
receiving a SIP 200 OK response from the ProSe function in response to the SIP register request confirming the de-registration.

4. The wireless UE of claim 1, wherein the ProSe function sends a third party SIP register request on behalf of the UE device to an application server corresponding to the application based at least in part on receiving the SIP register request from the UE device, wherein the ProSe function receives a SIP 200 OK response from the application server in response to the third party SIP register request.

5. The wireless UE of claim 1, wherein the SIP register request comprises a temporary public user identity based on an international mobile subscriber identity (IMSI) of the UE wireless UE device.

6. The wireless UE of claim 1, wherein the SIP register request comprises a SIP URI generated based on an international mobile subscriber identity (IMSI) of the UE device as a temporary public user identity, wherein a ProSe subscriber identifier is generated by the ProSe function for the UE device based on receiving the SIP register request from the UE device, wherein the SIP 200 OK response received from the ProSe function in response to the SIP register request includes the ProSe subscriber identifier for the UE device in a P-Associated-URI header field.

7. The wireless UE of claim 1, wherein obtaining proximity services comprises receiving one or more alerts when the wireless UE is in proximity with a second wireless UE.

8. The wireless UE of claim 1, wherein obtaining proximity services comprises receiving one or more location updates of a second wireless UE.

9. An apparatus for inclusion in a wireless user equipment (UE) device, comprising:
one or more processing elements, configured to:
register for cellular network assisted proximity services with a proximity services (ProSe) function of a cellular core network using session initiation protocol (SIP) signaling, wherein registering for cellular network assisted proximity services comprises:
sending a SIP register request to the ProSe function, wherein the SIP register request comprises application identification information for an application in conjunction with which to register the UE device for proximity services;
receiving a SIP 200 OK response from the ProSe function in response to the SIP register request;
sending a SIP subscribe request subscribing to a registration event package to the ProSe function;
receiving a SIP 200 OK response from the ProSe function in response to the SIP subscribe request confirming the subscription;
receiving a SIP notify request from the ProSe function informing the UE device that registration of the UE for proximity services is successful; and
sending a SIP 200 OK response to the ProSe function in response to the SIP notify request; and
obtain proximity services from the ProSe function of the cellular core network.

10. The apparatus of claim 9, wherein the one or more processing elements are further configured to:
de-register for cellular network assisted proximity services with the ProSe function of the cellular core network using SIP signaling, wherein de-registering for cellular network assisted proximity services comprises:
receiving a session initiation protocol (SIP) notify request from the ProSe function, wherein the SIP notify request corresponds to a registration event package, wherein the SIP notify request indicates de-registration of the UE device for proximity services to the UE device; and
sending a SIP 200 OK response to the ProSe function in response to the SIP notify request confirming the de-registration.

11. The apparatus of claim 9, wherein the one or more processing elements are further configured to:
de-register for cellular network assisted proximity services with the ProSe function of the cellular core network using SIP signaling, wherein de-registering for cellular network assisted proximity services comprises:
sending a session initiation protocol (SIP) register request to the ProSe function, wherein the SIP register request comprises an Expires header field with a value of "0" to indicate de-registration of the UE device for cellular network assisted proximity services; and
receiving a SIP 200 OK response from the ProSe function in response to the SIP register request confirming the de-registration.

12. The apparatus of claim 9, wherein the ProSe function sends a third party SIP register request on behalf of the UE device to an application server corresponding to the application based at least in part on receiving the SIP register request from the UE device, wherein the ProSe function receives a SIP 200 OK response from the application server in response to the third party SIP register request.

13. The apparatus of claim 9, wherein the SIP register request comprises a temporary public user identity based on an international mobile subscriber identity (IMSI) of the UE wireless UE device.

14. The apparatus of claim 9, wherein the SIP register request comprises a SIP URI generated based on an international mobile subscriber identity (IMSI) of the UE device as a temporary public user identity, wherein a ProSe subscriber identifier is generated by the ProSe function for the UE device based on receiving the SIP register request from the UE device, wherein the SIP 200 OK response received from the ProSe function in response to the SIP register request includes the ProSe subscriber identifier for the UE device in a P-Associated-URI header field.

15. The apparatus of claim 9, wherein obtaining proximity services comprises receiving one or more alerts when the wireless UE is in proximity with a second wireless UE.

16. The apparatus of claim 9, wherein obtaining proximity services comprises receiving one or more location updates of a second wireless UE.

17. An apparatus for inclusion in a wireless user equipment (UE) device, comprising:
one or more processing elements, configured to:
register for cellular network assisted proximity services with a proximity services (ProSe) function of a cellular core network using session initiation protocol (SIP) signaling;
obtain proximity services from the ProSe function of the cellular core network; and
de-register for cellular network assisted proximity services with the ProSe function of the cellular core network using SIP signaling, wherein de-registering for cellular network assisted proximity services comprises:
receiving a session initiation protocol (SIP) notify request from the ProSe function, wherein the SIP notify request corresponds to a registration event package, wherein the SIP notify request indicates de-registration of the UE device for proximity services to the UE device; and
sending a SIP 200 OK response to the ProSe function in response to the SIP notify request confirming the de-registration.

18. The apparatus of claim 17, wherein de-registering for cellular network assisted proximity services comprises:
sending a session initiation protocol (SIP) register request to the ProSe function, wherein the SIP register request comprises an Expires header field with a value of "0" to indicate de-registration of the UE device for cellular network assisted proximity services; and
receiving a SIP 200 OK response from the ProSe function in response to the SIP register request confirming the de-registration.

19. The apparatus of claim 17, wherein registering for cellular network assisted proximity services further comprises:
sending a SIP register request to the ProSe function, wherein the SIP register request comprises application identification information for an application in conjunction with which to register the UE device for proximity services;
receiving a SIP 200 OK response from the ProSe function in response to the SIP register request;

sending a SIP subscribe request subscribing to a registration event package to the ProSe function;
receiving a SIP 200 OK response from the ProSe function in response to the SIP subscribe request confirming the subscription;
receiving a SIP notify request from the ProSe function informing the UE device that registration of the UE for proximity services is successful; and
sending a SIP 200 OK response to the ProSe function in response to the SIP notify request.

20. The apparatus of claim 17, wherein obtaining proximity services comprises receiving one or more alerts when the wireless UE is in proximity with a second wireless UE.

\* \* \* \* \*